(12) United States Patent  
Emori

(10) Patent No.: US 9,669,301 B2  
(45) Date of Patent: Jun. 6, 2017

(54) PERIPHERAL DEVICE FOR USE WITH A GAMING MACHINE TO IMAGE THE FACE OF A PLAYER

(71) Applicants: Universal Entertainment Corporation, Koto-ku, Tokyo (JP); Aruze Gaming America, Inc., Las Vegas, NV (US)

(72) Inventor: Kazuki Emori, Tokyo (JP)

(73) Assignees: Universal Entertainment Corporation, Koto-ku, Tokyo (JP); Aruze Gaming America, Inc., Las Vegas, NV (US)

( * ) Notice: Subject to any disclaimer, the term of this patent is extended or adjusted under 35 U.S.C. 154(b) by 172 days.

(21) Appl. No.: 14/401,825

(22) PCT Filed: Apr. 4, 2013

(86) PCT No.: PCT/JP2013/060371  
§ 371 (c)(1),  
(2) Date: Nov. 17, 2014

(87) PCT Pub. No.: WO2013/172112  
PCT Pub. Date: Nov. 21, 2013

(65) Prior Publication Data  
US 2015/0157930 A1 Jun. 11, 2015

(30) Foreign Application Priority Data  
May 18, 2012 (JP) ................. 2012-115070

(51) Int. Cl.  
G06F 17/00 (2006.01)  
G06F 19/00 (2011.01)  
(Continued)

(52) U.S. Cl.  
CPC ............ *A63F 13/213* (2014.09); *A63F 13/55* (2014.09); *G07F 17/3211* (2013.01)

(58) Field of Classification Search  
CPC .. G07F 17/32; G07F 17/3202; G07F 17/3206; G07F 17/3211; G07F 17/3216;  
(Continued)

(56) References Cited

U.S. PATENT DOCUMENTS 6,142,876 A * 11/2000 Cumbers ............ G06K 9/00597  
                                                                     235/380  
6,554,705 B1 * 4/2003 Cumbers ............ G06K 9/00597  
                                                                     463/29  
(Continued)

FOREIGN PATENT DOCUMENTS

JP         H 1199281         4/1999  
JP         2000089302 A *   3/2000  
(Continued)

OTHER PUBLICATIONS

Int'l Search Report.

*Primary Examiner* — Milap Shah  
(74) *Attorney, Agent, or Firm* — KMF Patent Services, PLLC; Kenneth Fagin; s. Peter Konzel

(57) ABSTRACT

The present application provides a game peripheral device including an auxiliary light device available for long-time use. An emission brightness determination device for determining emission brightness of illumination light determines the emission brightness at first emission brightness under the condition where a brightness determination signal has been detected and determines the emission brightness at second emission brightness under the condition where an imaging device has taken an image of a player's face.

4 Claims, 22 Drawing Sheets

(51) Int. Cl.
  *A63F 13/213* (2014.01)
  *G07F 17/32* (2006.01)
  *A63F 13/55* (2014.01)

(58) Field of Classification Search
  CPC .... G07F 17/3286; A63F 13/213; A63F 13/40; A63F 13/55
  See application file for complete search history.

(56) References Cited

U.S. PATENT DOCUMENTS

| | | | |
|---|---|---|---|
| 6,612,928 B1* | 9/2003 | Bradford | G06F 21/31 463/29 |
| 2003/0060280 A1* | 3/2003 | Oles | G07F 17/32 463/29 |
| 2006/0177109 A1* | 8/2006 | Storch | A63F 1/00 382/118 |
| 2007/0213117 A1* | 9/2007 | Okada | A63F 7/022 463/16 |
| 2008/0102937 A1* | 5/2008 | Fujimoto | G07F 17/3206 463/25 |
| 2008/0102938 A1* | 5/2008 | Fujimoto | G07F 17/3206 463/25 |
| 2008/0102939 A1* | 5/2008 | Fujimoto | G07F 17/3206 463/25 |
| 2008/0207319 A1* | 8/2008 | Okada | G07F 17/3241 463/31 |
| 2010/0255902 A1* | 10/2010 | Goldstein | G07F 17/32 463/29 |

FOREIGN PATENT DOCUMENTS

| | | |
|---|---|---|
| JP | 2000089303 A * | 3/2000 |
| JP | 2006323286 | 11/2006 |
| JP | 2006333913 A * | 12/2006 |
| JP | 2008200132 | 9/2008 |
| JP | 2008279262 | 11/2008 |
| JP | 2008305192 | 12/2008 |
| JP | 2012061112 | 3/2012 |
| JP | 2013240456 A * | 12/2013 |
| WO | WO96/25210 | 8/1996 |
| WO | WO 2013/172112 | 11/2013 |

\* cited by examiner

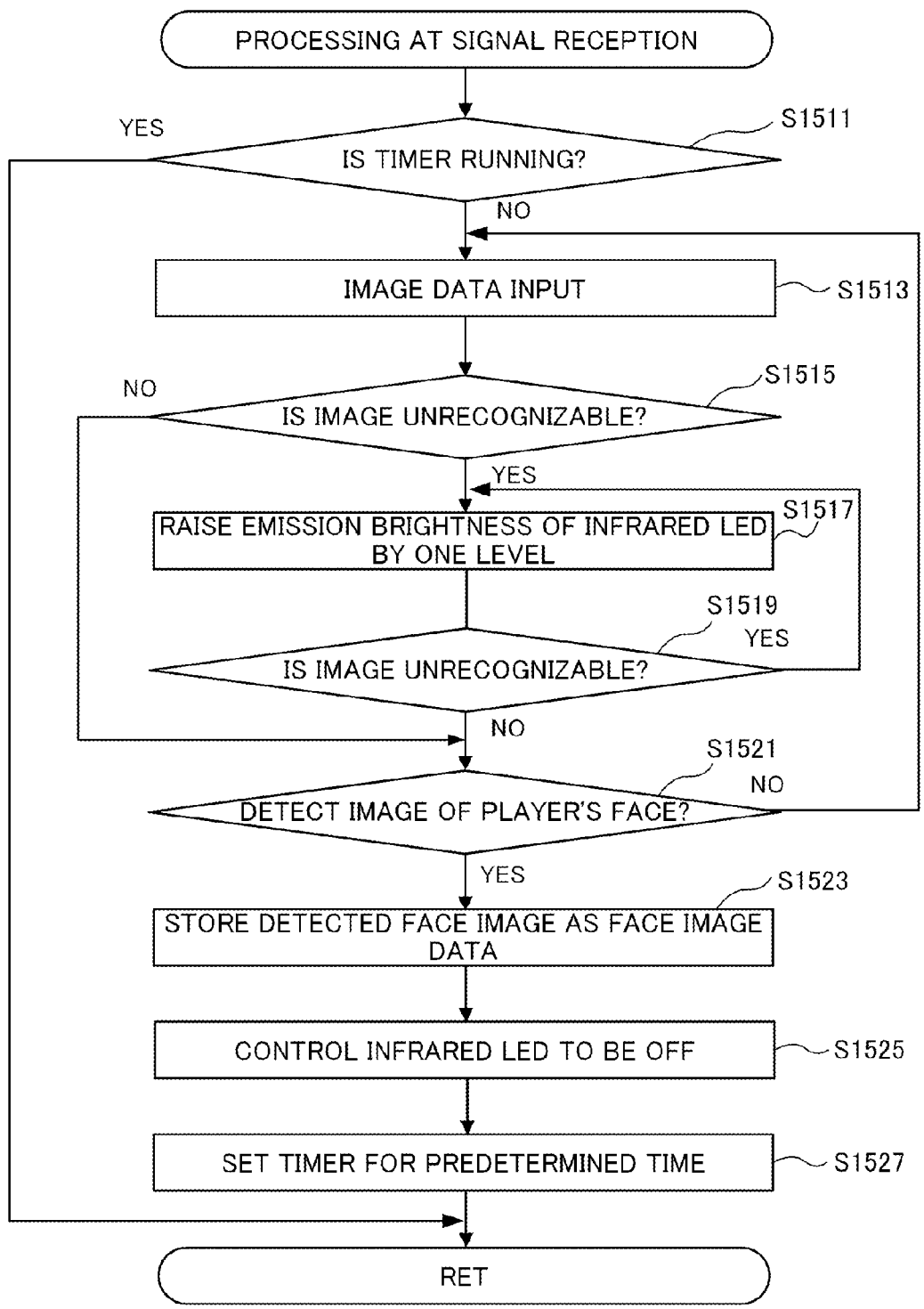

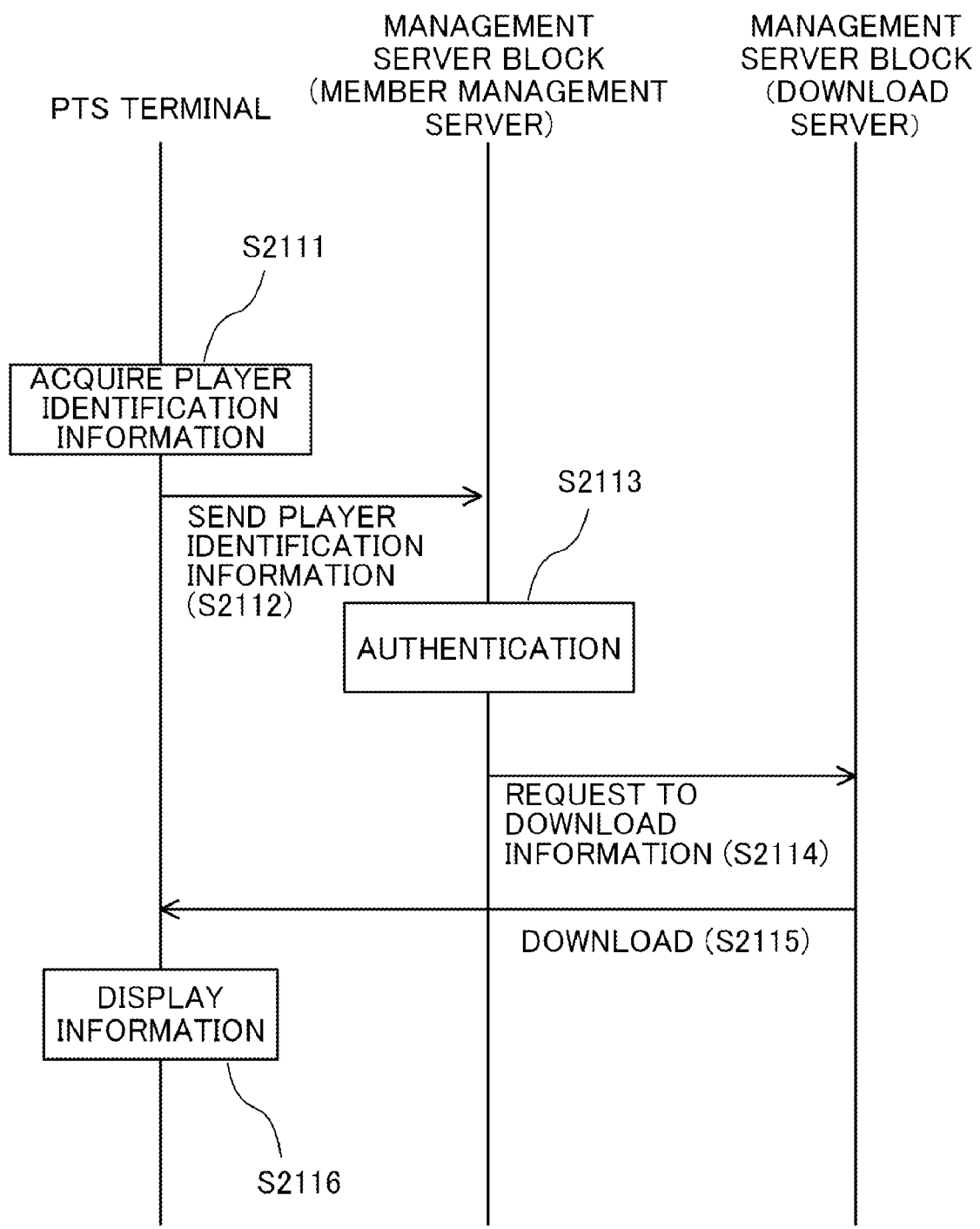

PERIPHERAL DEVICE FOR USE WITH A GAMING MACHINE TO IMAGE THE FACE OF A PLAYER

TECHNICAL FIELD

The present invention relates to a game peripheral device for a pachinko game machine or a pachi-slot game machine, and in particular, relates to a technique to acquire a face image. The present invention further relates to a technique to acquire a face image with a player tracking system (PTS) provided in a gaming machine installed in a casino or other place.

BACKGROUND ART

Traditionally, there exist game media dispensers to dispense token coins or pachinko balls as game peripheral devices for pachinko game machines or pachi-slot game machines. The token coins or pachinko balls are treated as valuable media like money in game halls; they are more likely to be cheated on. For this reason, a game media dispenser equipped with an imaging device such as a CCD camera is provided in a game hall to take an image of a player's face with the imaging device. Such a game media dispenser checks the captured face image data against the face image data registered in, for example, a management computer to determine whether the player is a registered person himself/herself (for example, refer to Patent Literature 1).

CITATION LIST

Patent Literature

Patent Literature 1: Japanese Unexamined Patent Application Publication No. 2008-200132

SUMMARY OF INVENTION

Technical Problem

In recent days, the presentation effects produced by game halls in opening hours have been diversified more and more to attract players, for example by lighting the game hall brightly to produce a vigorous hall or dimming the light of the game hall to produce a relaxing mood. Even in a single game hall, different presentation effects may be produced depending on the character or theme of the pachinko game machine or pachi-slot game machine.

When the aforementioned traditional imaging device included in a gaming media dispenser is used in a brightly illuminated game hall, the face image of a player can be sufficiently identified by the image data acquired from the imaging device. However, when it is used in a dim game hall, the face image of a player cannot be identified by the image data acquired from the imaging device.

For this reason, game media dispensers including an auxiliary light device such as an infrared LED are installed in the current game halls. The infrared LED illuminates the player's face with infrared light so that the face image of the player can be identified by the image data acquired from the imaging device.

However, such a game media dispenser including an auxiliary light device keeps illuminating the player's face with infrared light at fixed brightness during the entire opening hours of the game hall to clearly identify the image of the player's face. As a result, the auxiliary light device is forced to have a short life. Accordingly, frequent replacements of the auxiliary light device are required, increasing the cost.

In the meanwhile, an overseas casino demands a system that can identify a player's face to conduct personal authentication of the player. Authentication of each player allows a casino to improve their services, for example, by providing a person who frequently plays games in the casino with services different from other players. Hence, gaming machines installed in a casino are equipped with a PTS including a camera. The camera takes images of the players' faces so that the images of the players' faces can be identified with the image data.

Such overseas casinos may also dim the light to increase the presentation effects. Particularly in overseas casinos, people having more sensitive optic nerves than Japanese people play games; the lighting may be set dimmer than in halls in Japan. A system that can identify players' faces in such an environment to conduct personal authentication of the players is demanded in the overseas.

In the case of such a casino, it is also supposed that the player's face is kept illuminated at fixed brightness during the entire opening hours of the casino to clearly identify the image of the player's face. As a result, the light source may be forced to have a short life. Accordingly, frequent replacements of the auxiliary light device are required, increasing the cost.

The present invention has been accomplished in view of the foregoing issues; an object of the present invention is to provide a game peripheral device including an auxiliary light device allowing long-term use.

Solution to Problem

A game peripheral device according to an embodiment of the present invention comprises:
an imaging device for taking an image of a player's face;
a lighting device for emitting illumination light for illuminating the player's face;
a brightness determination signal detection device for detecting a brightness determination signal;
an emission brightness determination device for determining emission brightness of the illumination light based on detection of a brightness determination signal; and
a lighting controller for controlling the lighting device to emit illumination light based on the emission brightness determined by the emission brightness determination device,
the emission brightness determination device determines the emission brightness at first emission brightness under a condition where a brightness determination signal has been detected, and
the emission brightness determination device determines the emission brightness at second emission brightness which is lower than the first emission brightness under a condition where the imaging device has taken an image of a player's face.

Since the emission brightness is determined at the first emission brightness under the condition where a brightness determination signal has been detected and determined at the second emission brightness which is lower than the first emission brightness under the condition where an image of the player's face has been taken, the lighting device does not need to light at high emission brightness all the time to illuminate the player's face, so that the lighting device can increase its life. As a result, cost saving is achieved.

Furthermore, in the game peripheral device according to an embodiment of the present invention, the brightness determination signal detection device detects an operation signal output based on a predetermined operation by an operator and indicating the predetermined operation by the operator as the brightness determination signal, and the emission brightness determination device determines the emission brightness at the first emission brightness under a condition where the operation signal has been detected as the brightness determination signal.

Since the emission brightness of the lighting device is changed based on the predetermined operation by the player, the emission brightness can be changed easily.

Still further, in the game peripheral device according to an embodiment of the present invention, the brightness determination signal detection device detects a game signal output from a game machine based on a predetermined operation on the game machine and indicating game information in the game machine as the brightness determination signal, and the emission brightness determination device determines the emission brightness at the first emission brightness under a condition where the game signal has been detected as the brightness determination signal.

For example, in the case where the game peripheral device is a game media dispenser, it is supposed to change the emission brightness of the lighting device based on a predetermined operation of the game media dispenser by an operator. In this configuration, however, if the operator plays games with balls/tokens brought by the operator, the emission brightness of the lighting device might not be changed since the operator never touches the game media dispenser. The game peripheral device of the present invention changes the emission brightness of the lighting device in response to receipt of a game signal sent from the game machine based on a predetermined game operation (such as insertion of a ball/token brought by the player into the game machine); accordingly, an image of the face of the player playing games can be taken clearly.

Yet further, in the game peripheral device according an embodiment of the present invention, the game peripheral device is provided in each of a first game machine island and a second game machine island disposed to face the first game machine island at a predetermined interval and the imaging device of the game peripheral device provided in the second game machine island is located in a direction of illumination with illumination light emitted from the lighting device in the game peripheral device provided in the first game machine island.

The imaging device of the game peripheral device provided in the second game machine island (referred to as the imaging device of the second game machine island) faces the lighting device of the game peripheral device provided in the first game machine island (referred to as the lighting device of the first game machine island). For this reason, the illumination light emitted from the lighting device of the first game machine island becomes backlight for the imaging device of the second game machine island. In backlight, the imaging device of the second game machine island may not be able to take a clear image of the face of the player playing with the game machine in the second game machine island.

However, if the emission brightness is determined at the second emission brightness lower than the first emission brightness under the condition where the imaging device of the first game machine island has taken an image of the player's face, the illumination light emitted from the lighting device of the first game machine island will be difficult to reach the imaging device of the second game machine island, so that the imaging device of the second game machine island can take a clear image of the player's face with the illumination light emitted from the lighting device of the second game machine island.

A game peripheral device according to an embodiment of the present invention comprises:

a night vision camera provided in a gaming machine installed in an indoor casino, the night vision camera being configured to take an image of the face of a player playing games with the gaming machine;

a light for emitting infrared light with which the face of the player is illuminated; and a controller for controlling the light, and the controller controls the light to emit infrared light at predetermined emission brightness.

In an overseas casino where the illumination is set low, the player's face can be identified to allow personal authentication of the player.

Advantageous Effects of Invention

An auxiliary light device for lighting a player's face can be used over a long time.

BRIEF DESCRIPTION OF DRAWINGS

FIG. 7 is a flowchart illustrating processing in the game media dispenser 310 (410) at power-on;

Figure 14A:
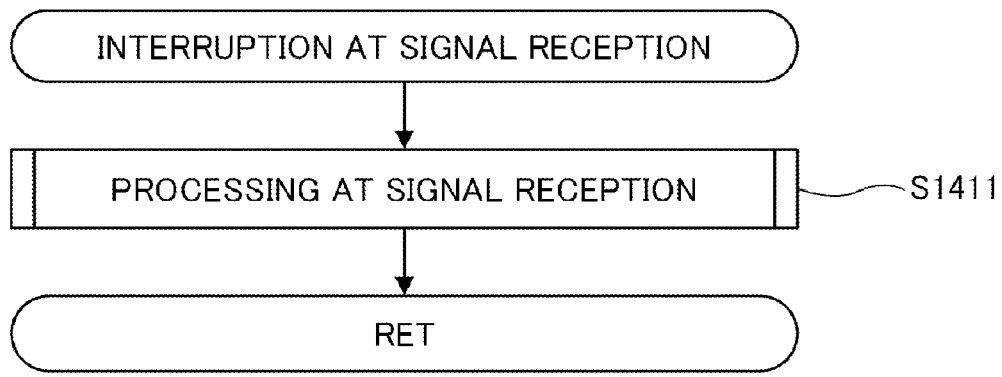
FIG. 14A provides a flowchart illustrating interruption at signal reception in the game media dispenser 310 and FIG.
Figure 16:
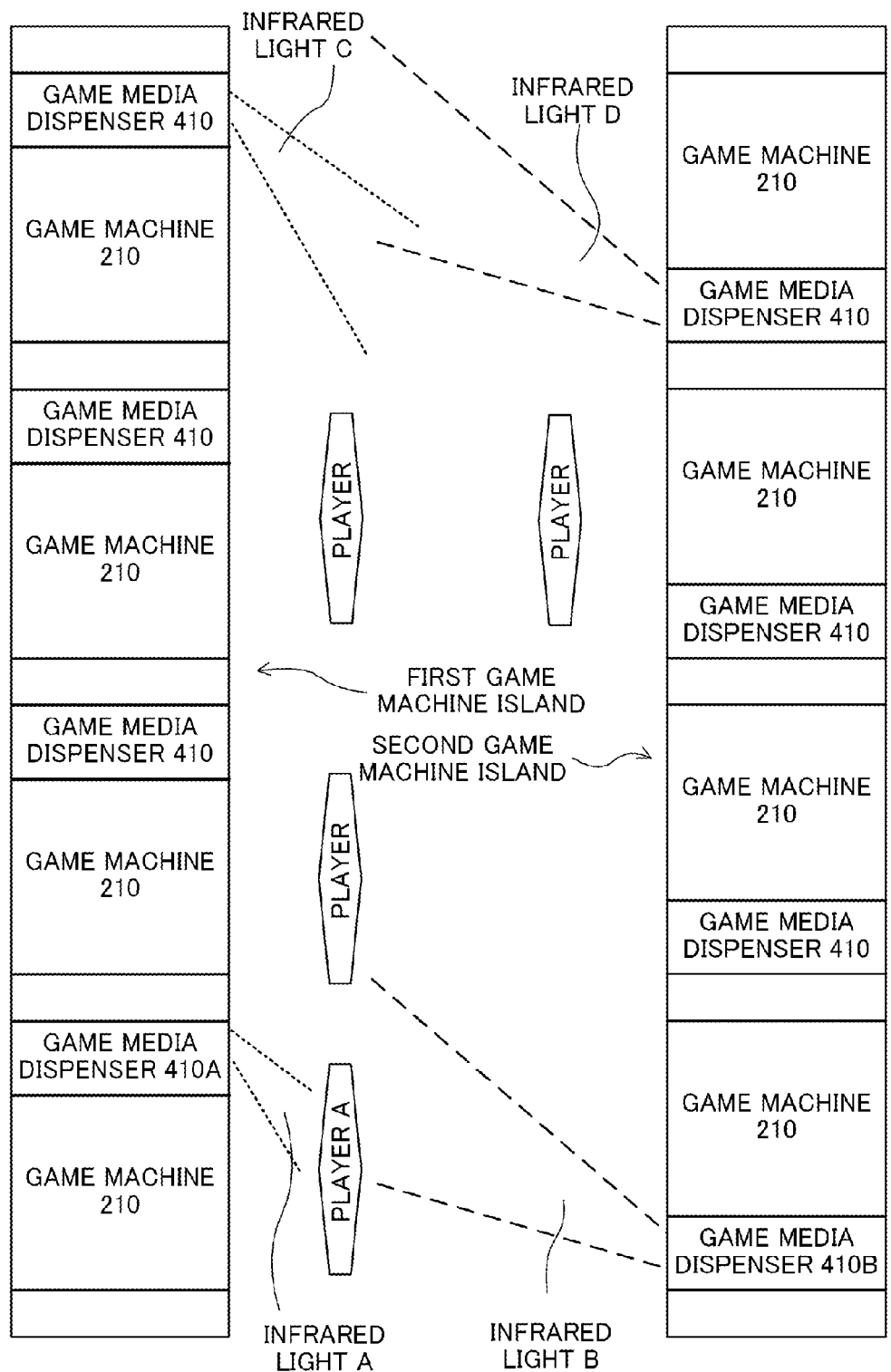
Figure 17:
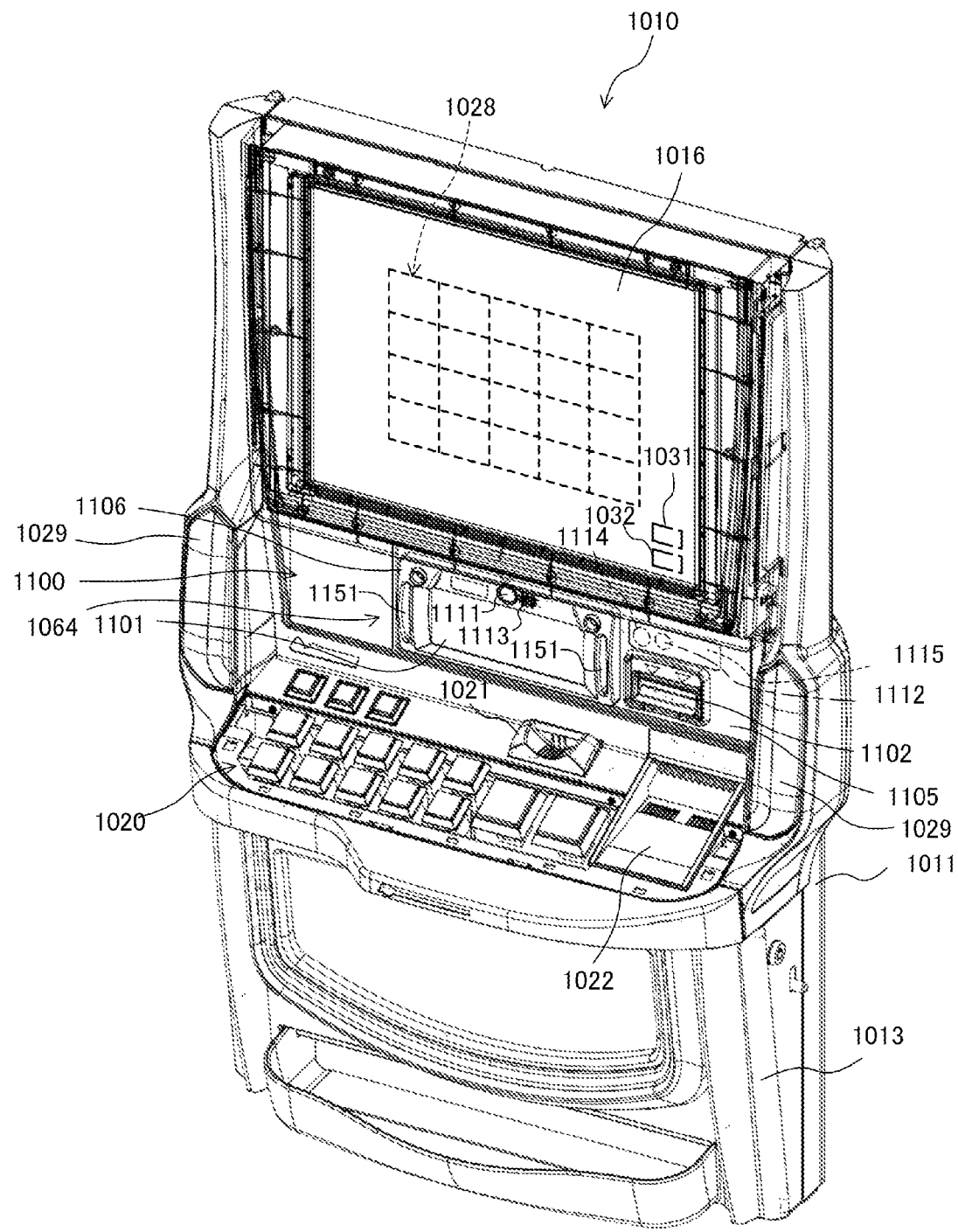
Figure 18:
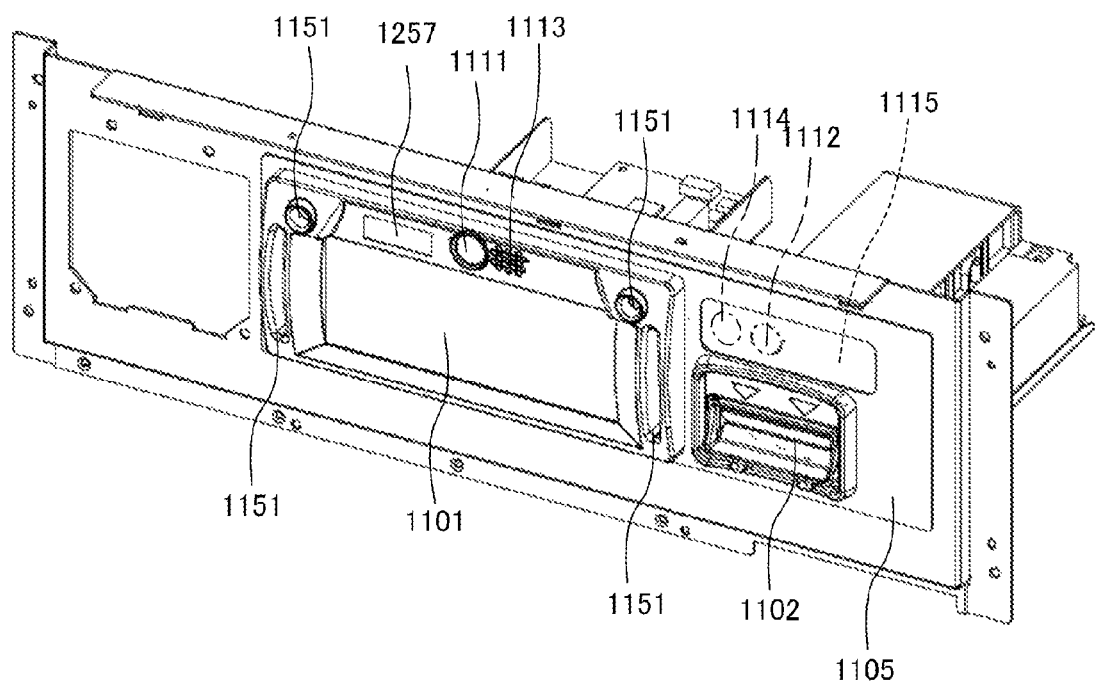
Figure 19:
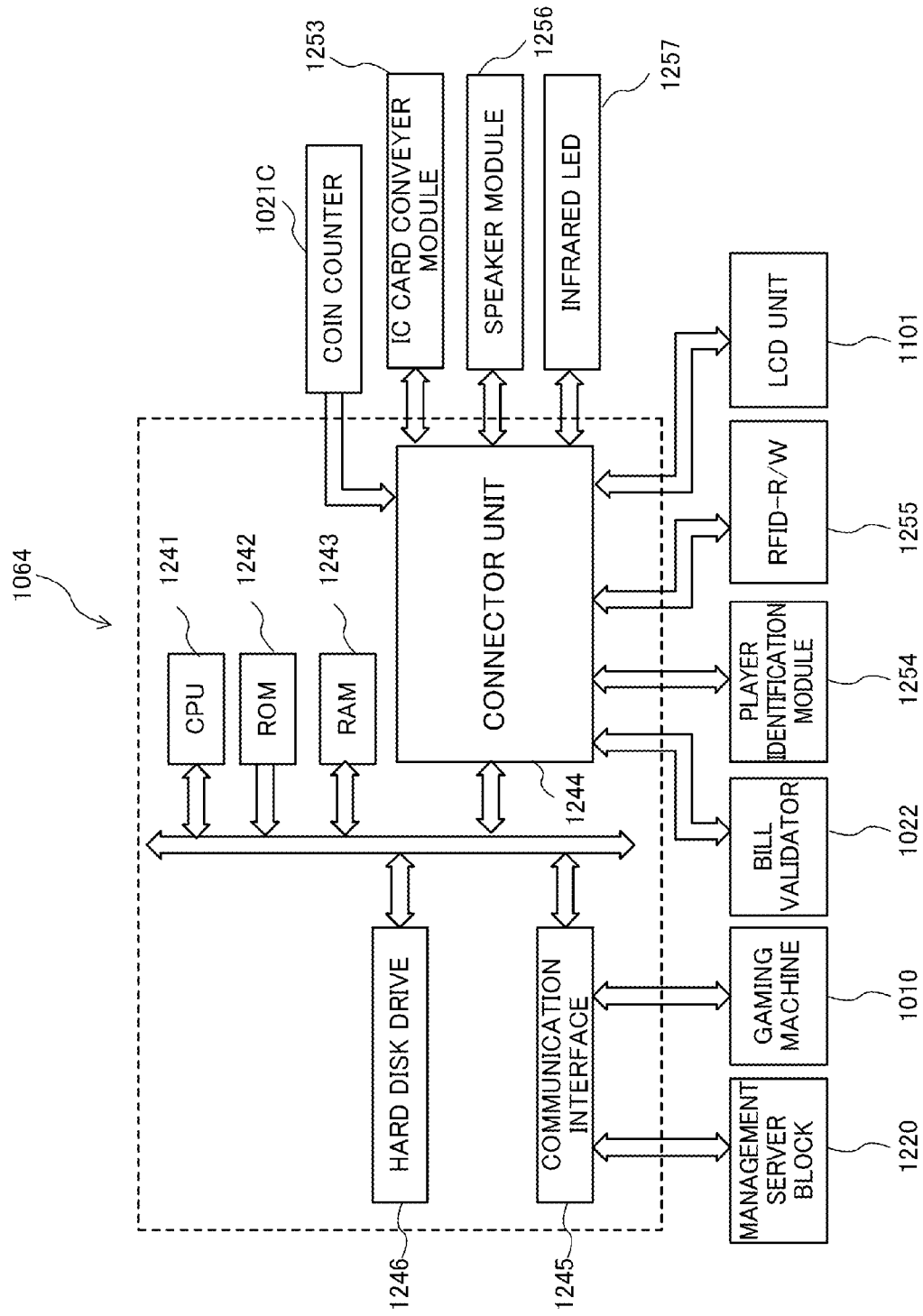
Figure 20:
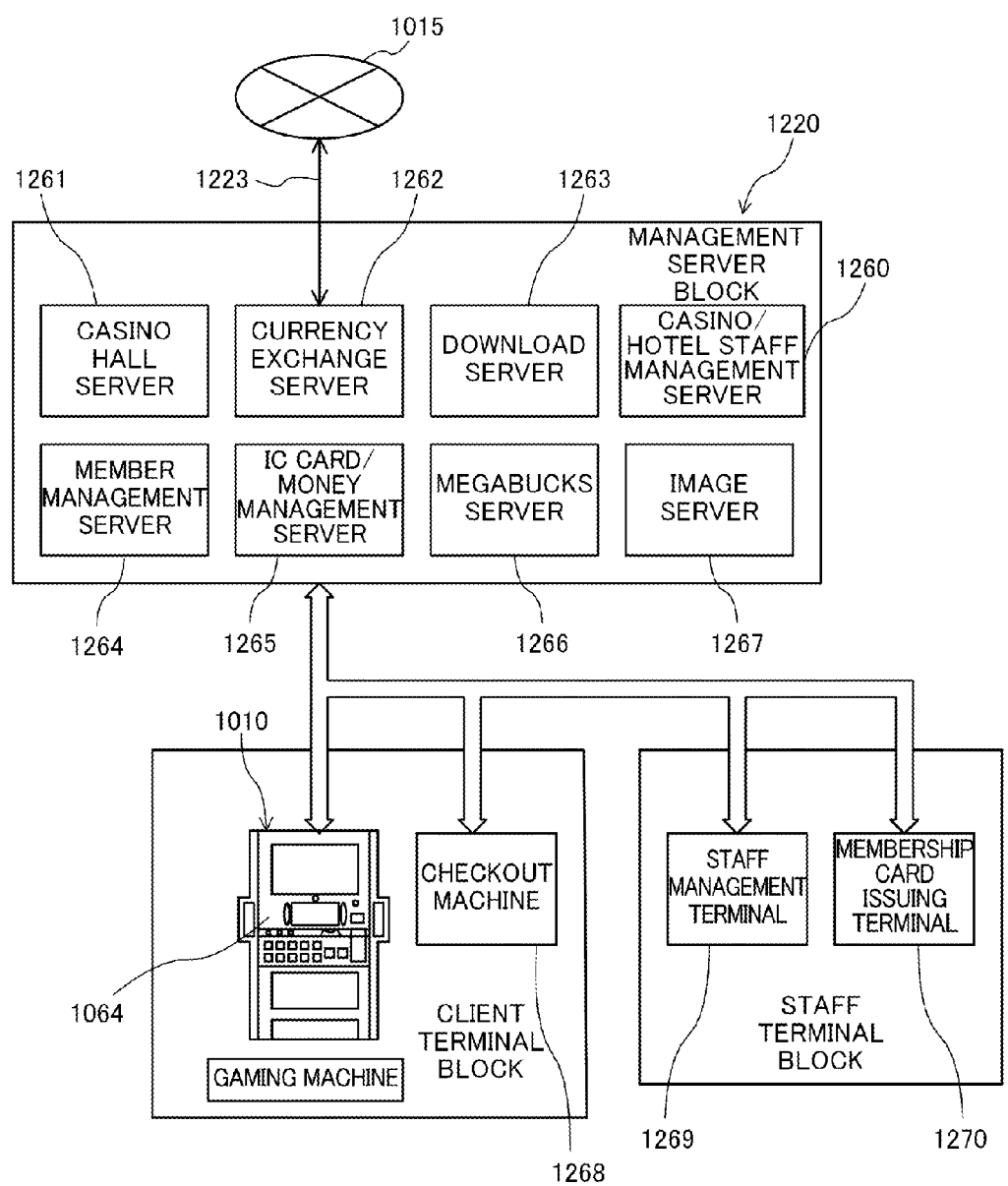

14B provides a flowchart illustrating interruption to timer performed after generating an interruption at predetermined intervals;

FIG. 15 illustrates a subroutine of processing at signal reception invoked and executed at Step S1413 in FIG. 14A;

FIG. 16 is a schematic diagram illustrating a layout of pachi-slot game machines 210 and game media dispensers 410, emission of infrared light, and locations of players in a game hall;

FIG. 17 is a perspective view illustrating an appearance of a gaming machine;

FIG. 18 is a perspective view illustrating a PTS terminal;

FIG. 19 is a block diagram illustrating a configuration of the PTS terminal;

FIG. 20 is a block diagram illustrating a system of a casino including gaming machines; and FIG. 21 is a timing chart illustrating a processing procedure of a PTS terminal and a management server block.

DESCRIPTION OF EMBODIMENTS

<<<First Embodiment>>>

Hereinafter, a first embodiment is described with reference to the drawings.

Figure 1:
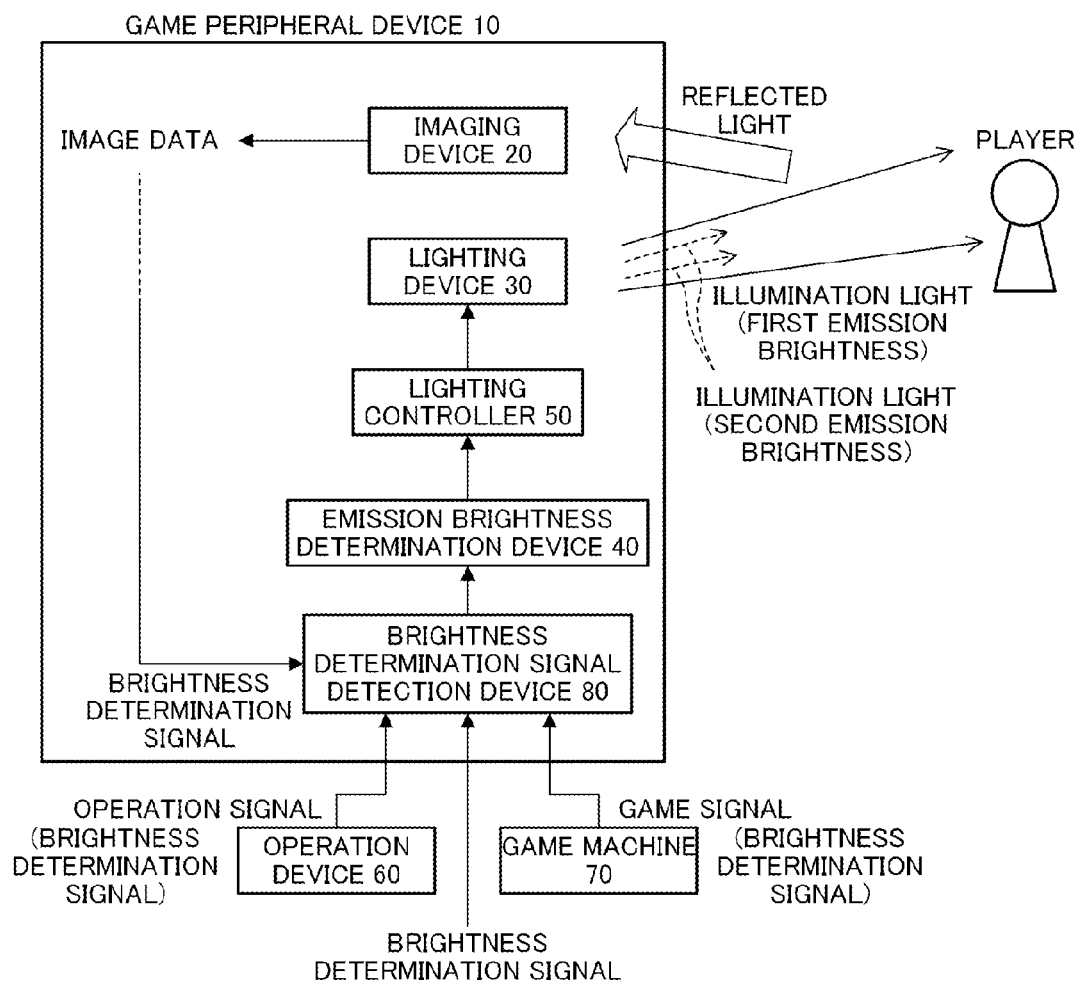
FIG. 1 is a general diagram illustrating a general configuration of an auxiliary light device according to an embodiment.

As illustrated in FIG. 1, a game peripheral device 10 according to the present embodiment comprises:

an imaging device 20 (e.g., a later-described camera 320 or 420) for taking image of a player's face;

a lighting device 30 (e.g., a later-described infrared LED 322 or 422) for emitting illumination light for illuminating the player's face;

a brightness determination signal detection device 80 (e.g., a later-described CPU 312 or 412 and a later-described interface 318 or 418) for detecting a brightness determination signal;

an emission brightness determination device 40 (e.g., a later-described CPU 312 or 412) for determining emission brightness of the illumination light based on detection of a brightness determination signal; and a lighting controller 50 (e.g., a later-described CPU 312 or 412) for controlling the lighting device to emit illumination light based on the emission brightness determined by the emission brightness determination device, the emission brightness determination device 40 determines the emission brightness at first emission brightness under a condition where a brightness determination signal has been detected, and the emission brightness determination device 40 determines the emission brightness at second emission brightness which is lower than the first emission brightness under a condition where the imaging device has taken an image of a player's face.

The brightness determination signal needs to be a signal detectable by the emission brightness determination device 40. That is to say, the brightness determination signal may be output from an internal device included in the game peripheral device or an external device not included in the brightness determination signal. Either an internal device of the game peripheral device or an external device can output a brightness determination signal as far as the emission brightness determination device 40 can detect the signal.

The second emission brightness needs to be lower than the first emission brightness. For example, when the lighting device is lighting at low brightness, the second emission brightness includes a state that the lighting device does not light at all or the off-state.

The game peripheral device is not limited to the later-described game media dispenser 310 or 410, but may be a device installed in a game hall to be able to communicate, such as a data display device 360 or 460, a hall computer 500, a card issuing machine (not shown), or a checkout machine (not shown).

Since the emission brightness is determined at the first emission brightness under the condition where a brightness determination signal has been detected and determined at the second emission brightness which is lower than the first emission brightness under the condition where an image of the player's face has been taken, the lighting device 30 does not need to light at high emission brightness all the time to illuminate the player's face, so that the lighting device 30 can increase its life. As a result, cost saving is achieved.

In addition to the foregoing configuration, in the game peripheral device according to the present embodiment, the brightness determination signal detection device 80 detects an operation signal output based on a predetermined operation by an operator and indicating the predetermined operation by the operator as the brightness determination signal, and the emission brightness determination device 40 determines the emission brightness at the first emission brightness under a condition where the operation signal has been detected as the brightness determination signal.

That is to say, the emission brightness determination device 40 regards the operation signal output based on the predetermined operation performed by the operator as a brightness determination signal and determines the emission brightness at the first emission brightness in response to the operation signal. The predetermined operation by the operator includes both of an operation using an operation device and an operation without using an operation device. Examples of the operation without using an operation device include an operation that an operator (player) inserts an information card into a game media dispenser 310 or 410 and an operation that an operator (player) holds a contactless IC card over the game media dispenser 310 or 410. In other words, the operation is not performed using an operation device to be directly operated by an operator but issues an operation signal in response to a predetermined operation performed by the operator. The operation using an operation device is performed using an operation device directly operated by an operator; for example, an operation of an operation device 60 (e.g., later-described touch panel 326 or 426) by an operator.

The predetermined operation by an operator is not limited to an operation of the later-described game media dispenser 310 or 410, but may be an operation of an apparatus that is operable by an operator and installed in a game hall to be able to communicate, such as a game machine (pachinko game machine 110 or pachi-slot game machine 210), a data display device 360 or 460, a hall computer 500, a card issuing machine (not shown), or a checkout machine (not shown), and outputs an operation signal in response to the operation.

For example, the operation signal may be an operation signal output when a game hall clerk operates a touch panel or a keyboard connected with the hall computer 500.

Since the emission brightness of the lighting device is changed based on the predetermined operation by an operator, the emission brightness can be changed easily.

In addition to the foregoing configuration, in the game peripheral device according to the present embodiment, the brightness determination signal detection device 80 detects a game signal output from a game machine 70 (e.g., a pachinko game machine 110 or a pachi-slot game machine 210) based on a predetermined operation on the game machine and indicating game information in the game machine as the brightness determination signal, and the emission brightness determination device 40 determines the emission brightness at the first emission brightness under a condition where the game signal has been detected as the brightness determination signal.

For example, in the case where the game peripheral device is a game media dispenser, it is supposed to change the emission brightness of the lighting device based on a predetermined operation of the game media dispenser by an operator. In this configuration, however, if the operator plays games with balls/tokens brought by the operator, the emission brightness of the lighting device might not be changed since the operator never touches the game media dispenser. The game peripheral device of the present invention changes the emission brightness of the lighting device in response to receipt of a game signal sent from the game machine based on a predetermined game operation (such as insertion of a ball/token brought by the player to the game machine); accordingly, an image of the face of the player playing games can be taken clearly.

As illustrated in FIGS. 1 and 16, the game peripheral device according to the present embodiment is provided in each of a first game machine island and a second game machine island disposed to face the first game machine island at a predetermined interval and the imaging device of the game peripheral device provided in the second game machine island is located in a direction of illumination with illumination light emitted from the lighting device in the game peripheral device provided in the first game machine island.

For example, as illustrated inn FIG. 16, the imaging device of the game peripheral device (game media dispenser 410A) provided in the second game machine island (referred to as the imaging device of the second game machine island) faces the lighting device of the game peripheral device (game media dispenser 410B) provided in the first game machine island (referred to as the lighting device of the first game machine island). For this reason, the illumination light (infrared light B) emitted from the lighting device of the first game machine island becomes backlight for the imaging device of the second game machine island. In backlight, the imaging device of the second game machine island may not be able to take a clear image of the face of the player playing with the game machine in the second game machine island.

However, if the emission brightness is determined at the second emission brightness lower than the first emission brightness under the condition where the imaging device of the first game machine island has taken an image of the player's face, the illumination light (infrared light B) emitted from the lighting device of the first game machine island will be difficult to reach the imaging device of the second game machine island, so that the imaging device of the second game machine island can take a clear image of the player's face with the illumination light (infrared light A) emitted from the lighting device of the second game machine island.

<<Overview of Pachinko Game Machine 110 and Game Media Dispenser 310>>

Figure 2:
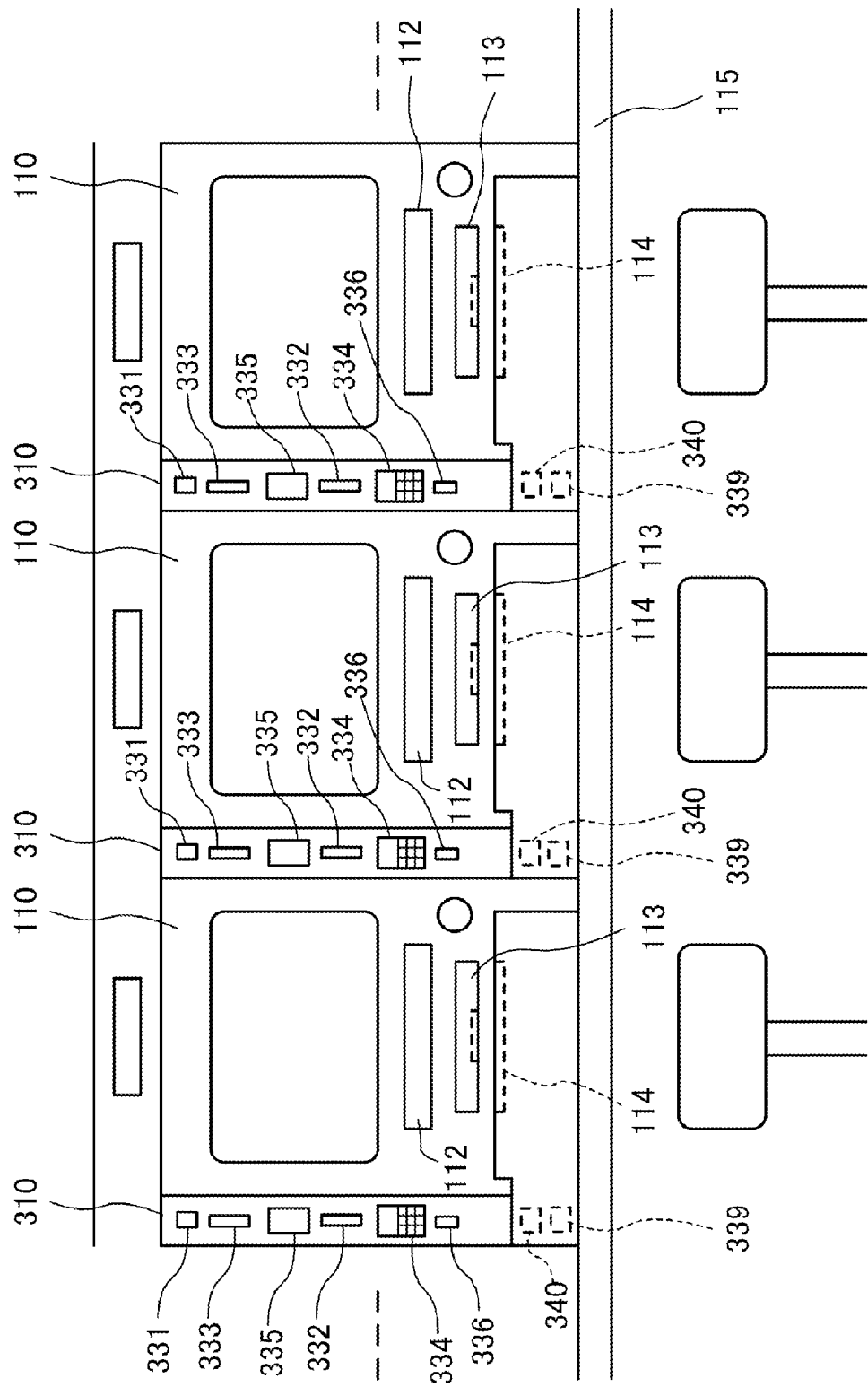
FIG. 2 is a front view of pachinko game machines 110 installed with game media dispensers 310 (sandwiched dispensers) in the embodiment.
Figure 3:
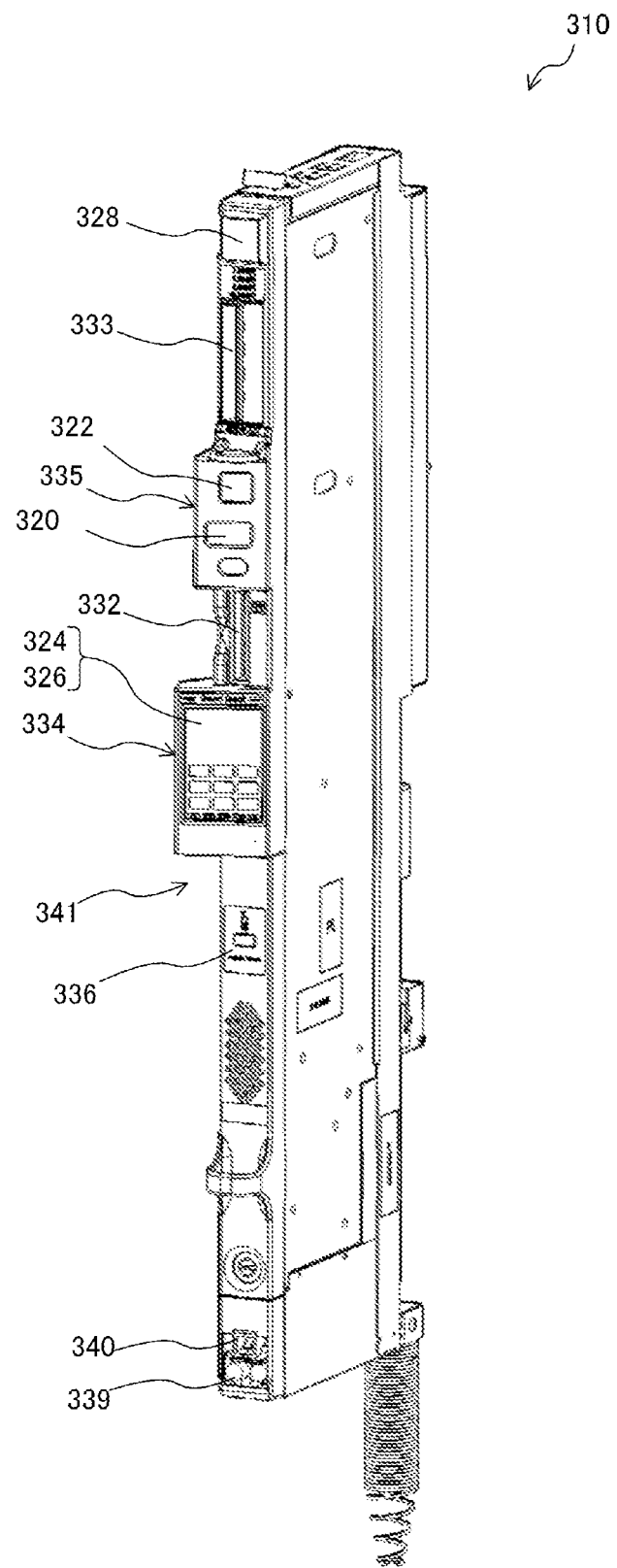
FIG. 3 is a perspective view of a game media dispenser 310.

FIG. 2 is a front view of pachinko game machines 110 installed with game media dispensers 310 (sandwiched dispensers) in the present embodiment. FIG. 3 is a perspective view of a game media dispenser 310.

As shown in FIG. 2, on the left of each pachinko game machine 110 as seen from the player, a game media dispenser 310 is placed. Each game media dispenser 310 is placed correspondingly to the adjacent pachinko game machine 110 and is connected with the corresponding pachinko game machine 110 to be able to communicate with each other. Each game media dispenser 310 is connected with a hall computer 500 (refer to FIG. 6) to be able to communicate with each other. The hall computer 500 manages the overall system of game media dispensers 310 and the sales in the game hall.

Although the present embodiment describes a game media dispenser 310 connected to be able to communicate with the hall computer 500, the present invention is not limited to this; the game media dispenser 310 does not need to communicate with the hall computer 500.

As shown in FIGS. 2 and 3, on the front 341 of each game media dispenser 310, a lamp 328, a card slot 332, a bill slot 333 to insert a bill therefrom, an operation unit 334, a camera unit 335, a contactless IC card reader/writer 336, a fractional ball outlet 340, and a ball counter inlet 339 are provided.

The card slot 332 is an insert formed to receive an information card issued by a card issuing machine (not-shown) installed in the game hall. The information card includes a membership card and a visitor card.

The lamp 328 is made of a full-color LED (light-emitting diode). The lamp 328 is a lamp for lighting depending on the status of the game media dispenser 310. The lamp 328 lights or blinks in different colors to notify a game hall clerk of the statuses of the game media dispenser 310.

Figure 6:
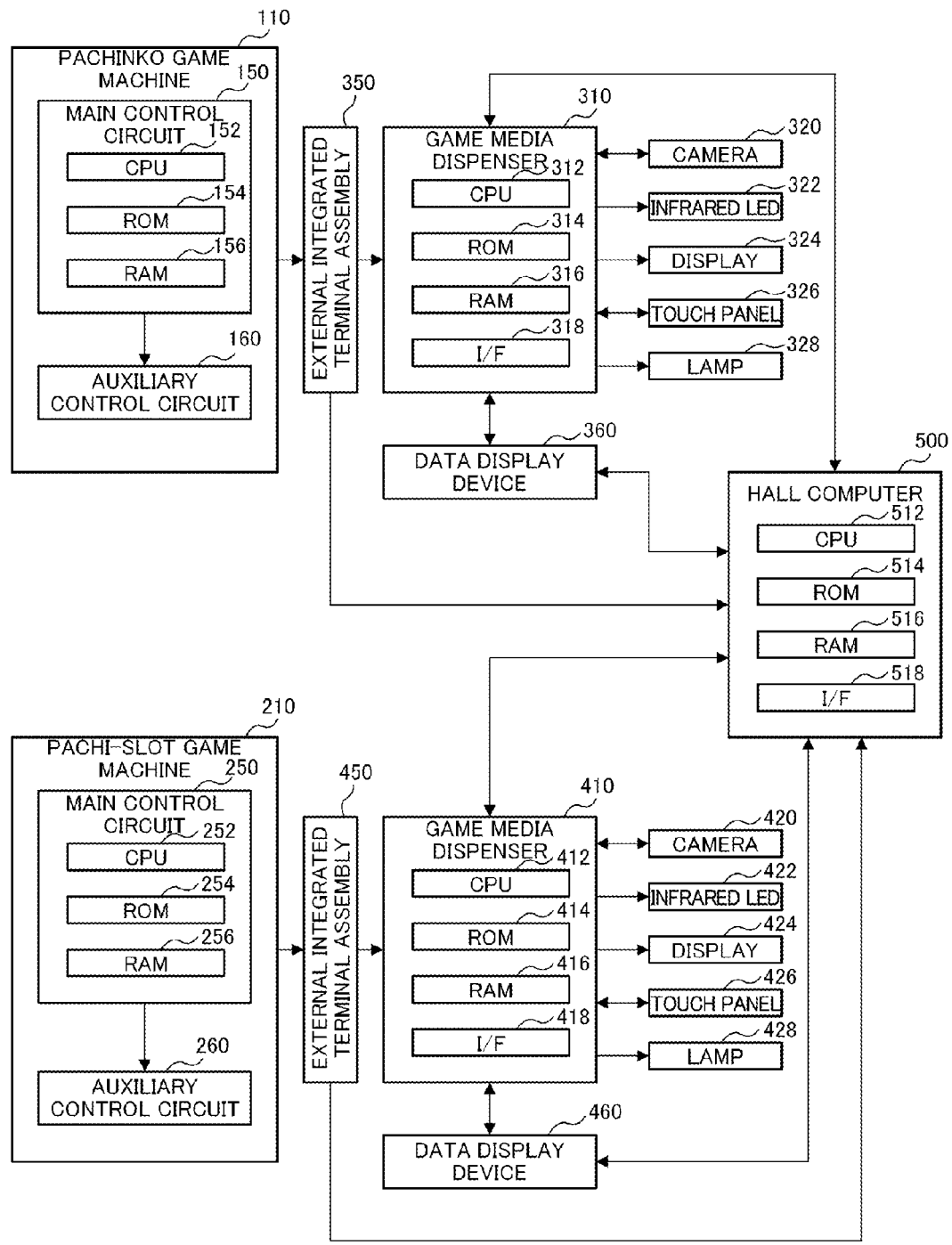
FIG. 6 is a block diagram illustrating general configurations of a pachinko game machine 110, a game media dispenser 310, a pachi-slot game machine 210, a game media dispenser 410, and a hall computer 500.

The operation unit 334 includes a display 324 and a touch panel 326 (refer to FIG. 6). The display 324 is made of an LCD (liquid crystal display). The display 324 displays the balance on a card, the number of stored balls, the number of owned balls, and icons resembling various operation buttons.

The touch panel 326 is stacked on the display 324. The display 324 displays icons resembling various buttons. For example, icons resembling various operation buttons, such as a DISPENSE button, a REPLAY button, a COUNT button, and a RETURN CARD button, are displayed on the display 324. The player can touch the areas of these icons resembling operation buttons. When the player touches an area of an icon resembling an operation button, the touch panel 326 outputs a signal indicating the operation button has been touched. The signal output from the touch panel 326 is sent to the game media dispenser 310. The CPU 312 of the game media dispenser 310 performs processing associated with the operation button operated by the player.

As noted from the above, the player touches areas of the touch panel 326 corresponding to the icons resembling operation buttons displayed on the display 324, instead of touching actual operation buttons. In the present embodiment, a touch to the touch panel 326 is referred to as merely an operation or a press of an operation button. The touch panel 326 has functions of a DISPENSE button, a REPLAY button, a COUNT button, and a RETURN CARD button.

The player inserts an information card or a specific amount of bill into the card slot 332 or the bill slot 333 to receive pachinko balls of game media required to play games. The player may hold a contactless IC card over the contactless IC card reader/writer 336 to receive pachinko balls required to play games.

When the game media dispenser 310 detects insertion of a variable medium such as an information card, a bill, or a contactless IC card, it sends a command to instruct the associated pachinko game machine 110 to eject a number of pachinko balls corresponding to the amount of inserted variable medium, so that the pachinko game machine 110 ejects the pachinko balls. The player can play pachinko games with the pachinko balls ejected to an upper tray 112 of the pachinko game machine 110.

The pachinko game machine 110 also ejects pachinko balls to the upper tray 112 depending on the game result. When the player drops the pachinko balls in the upper tray 112 to a lower tray 113 through a predetermined operation, the pachinko balls are dropped to a guide tray 114 attached to the lower part of the lower tray 113. The guide tray 114 directs the pachinko balls dropped from the lower tray 113 to the ball counter inlet 339 provided on the game media dispenser 310. The pachinko balls directed to the ball counter inlet 339 are counted by a counter unit provided inside the game media dispenser 310.

The result of the count is recorded in the information card inserted in the card slot 132 or stored in a storage unit of the hall computer 500.

The pachinko balls counted by the counter unit are discharged from an outlet provided on the back of the game media dispenser 310 to be collected.

Separate from the route to count pachinko balls received from the ball counter inlet 339, a fractional ball supply unit is provided on the back of the game media dispenser 310 to receive fractional pachinko balls from the external. This supply unit keeps a fixed number (for example, 24) of pachinko balls to stay as fractional pachinko balls and ejects them from the fractional ball outlet 340 to the guide tray 114 (specifically, a dedicated outlet tray provided at a lower part of the guide tray 114) as necessary.

<<Configuration of Camera Unit 335>>

As illustrated in FIG. 3, the camera unit 335 has a camera 320 and an infrared LED 322. The infrared LED 322 emits infrared light based on a command issued from the game media dispenser 310. The infrared light emitted from the infrared LED 322 illuminates the face of the player playing games at the pachinko game machine 110. The camera unit 335 takes an image of the player's face illuminated with the infrared light as a subject. The camera 320 outputs an image signal representing the captured player's face to the game media dispenser 310. The CPU 312 of the game media dispenser 310 performs image recognition based on the image signal output from the camera 320. The camera 320 can be a CCD camera or a CMOS camera.

In the camera unit 335, filters (not-shown) are provided over the infrared LED 322 and the camera 320. These filters transmit infrared light and do not transmit light having wavelengths other than the infrared wavelength. That is to say, the light received by the camera 320 is only the light emitted from the infrared LED 322 toward the subject, reflected by the subject, and transmitted through the filters. Such use of the filters prevents the camera 320 from being affected by light effects of the pachinko game machine 110 or the light effects in the game hall where the pachinko game machine 110 is installed. As a result, the camera unit 335 can take a clear image of the subject (player) while blocking the effect of the light other than the infrared light emitted from the infrared LED 322.

In the present embodiment, the emission brightness of the infrared LED 322 is controlled and adjusted by the CPU 312.

<<In the Case of Pachi-slot Game Machine 210>>

Figure 4:
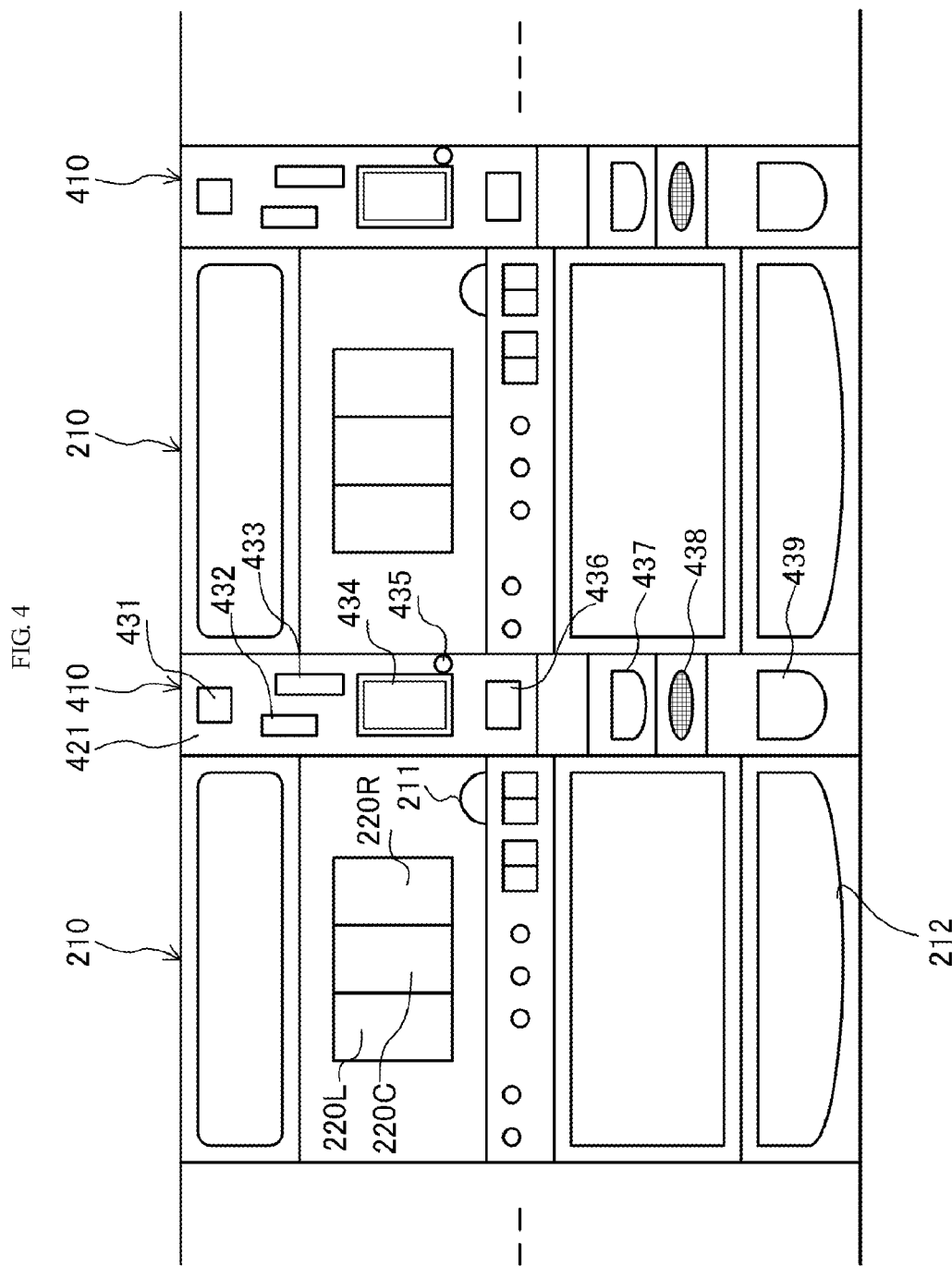
FIG. 4 is a front view of pachi-slot game machines installed with game media dispensers 410 (sandwiched dispensers) in the embodiment.
Figure 5:
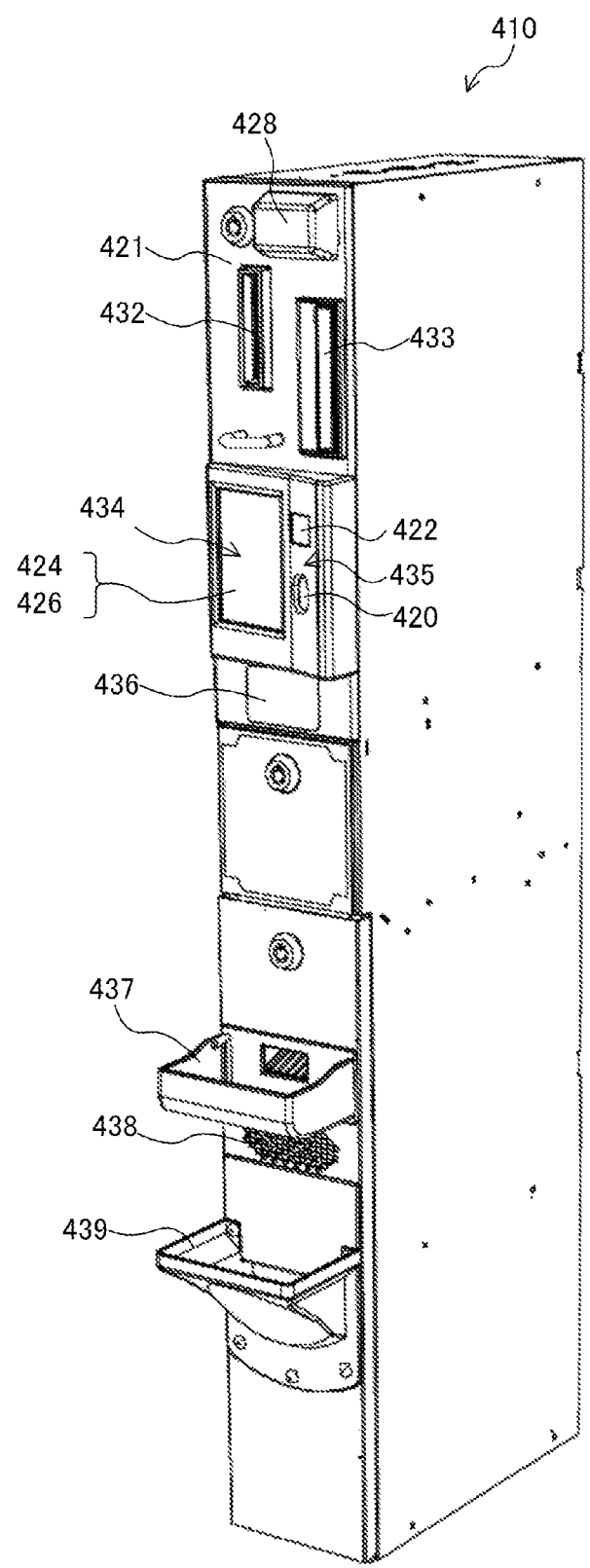
FIG. 5 is a perspective view of a game media dispenser 410.

FIG. 4 is a front view of pachi-slot game machines installed with game media dispensers 410 (sandwiched dispensers) in the present embodiment. FIG. 5 is a perspective view of a game media dispenser 410.

As shown in FIG. 4, on the right of each pachi-slot game machine 210 as seen from the player, a game media dispenser 410 is placed. Each game media dispenser 410 is placed correspondingly to the adjacent pachi-slot game machine 210 and is connected with the corresponding pachi-slot game machine 210 to be able to communicate with each other. Each game media dispenser 410 is connected with a hall computer 500 (refer to FIG. 6) to be able to communicate with each other. The hall computer manages the overall system of game media dispensers 410 and the sales in the game hall.

Although the present embodiment describes a game media dispenser 410 connected to be able to communicate with the hall computer 500, the present invention is not limited to this; the game media dispenser 410 does not need to communicate with the hall computer 500.

As shown in FIGS. 4 and 5, on the front 421 of each game media dispenser 410, a lamp 428, a card slot 432, a bill slot 433 to insert a bill therefrom, an operation unit 434, a camera unit 435, a contactless IC card reader/writer 436, a token (game media) outlet tray 437, a speaker cover 438, and a token (game media) counter inlet 439 are provided.

The card slot 432 is an insert formed to receive an information card issued by a card issuing machine (not-shown) installed in the game hall. The information card includes a membership card and a visitor card.

The lamp 428 is made of a full-color LED (light-emitting diode). The lamp 428 is a lamp for lighting depending on the status of the game media dispenser. The lamp 428 lights or blinks in different colors to notify a game hall clerk of the statuses of the game media dispenser 410.

The operation unit 434 includes a display 424 and a touch panel 426 (refer to FIG. 6). The display 424 is made of an LCD (liquid crystal display). The display 424 displays the balance on a card, the number of stored tokens, the number of owned tokens, and icons resembling various operation buttons.

The touch panel 426 is stacked on the display 424. The display 424 displays icons resembling various buttons. For example, icons resembling various operation buttons, such as a DISPENSE button, a REPLAY button, a COUNT button, and a RETURN CARD button, are displayed on the display 424. The player can touch the areas of these icons resembling operation buttons. When the player touches an area of an icon resembling an operation button, the touch panel 426 outputs a signal indicating the operation button has been touched. The signal output from the touch panel 426 is directed to the game media dispenser 410. The CPU 412 of the game media dispenser 410 performs processing associated with the operation button operated by the player.

As noted from the above, the player touches areas of the touch panel 426 corresponding to the icons resembling various operation buttons displayed on the display 424, instead of touching actual operation buttons. In the present embodiment, a touch to the touch panel is referred to as merely an operation or a press of an operation button. The touch panel 426 has functions of a DISPENSE button, a REPLAY button, a COUNT button, and a RETURN CARD button.

The player inserts an information card or a specific amount of bill into the card slot 432 or the bill slot 433 to receive tokens of game media required to play games. The player may hold a contactless IC card over the contactless IC card reader/writer 436 to receive tokens required to play games.

When the game media dispenser 410 detects insertion of a variable medium such as an information card, a bill, or a contactless IC card, it counts a number of tokens corresponding to the amount of the inserted variable medium with an internal ejection hopper (first counter) and ejects them into the token outlet tray 437. The player inserts the tokens ejected into the token outlet tray 437 into a token slot 211 in the pachi-slot game machine 210 to play games with the pachi-slot game machine 210.

The pachi-slot game machine 210 also ejects tokens to a token outlet tray 212 depending on the game result. The player scoops the tokens from the token outlet tray 212 and puts them into the token counter inlet 439 of the game media dispenser 410 to make the game media dispenser 410 count them. The game media dispenser 410 counts the tokens received at the token counter inlet 439 with an internal counter hopper (second counter).

The result of the count is recorded in the information card inserted in the card slot 432 or stored in a storage unit of the hall computer 500.

The tokens counted by the counter hopper are discharged from an outlet provided at the bottom of the game media dispenser 410 to a conveyer to be collected. In a game hall where the conveyer is not provided, a storage box to store tokens may be provided at the lower part of the game media dispenser 410 so as to receive the discharged tokens.

<<Configuration of Camera Unit 435>>

As illustrated in FIG. 5, the camera unit 435 has a camera 420 and an infrared LED 422. The infrared LED 422 emits infrared light based on a command issued from the game media dispenser 410. The infrared light emitted from the infrared LED 422 illuminates the face of the player playing games at the pachi-slot game machine 210. The camera unit 435 takes an image of the player's face illuminated with the infrared light as a subject. The camera 420 outputs an image signal representing the captured player's face to the game media dispenser 410. The CPU 412 of the game media dispenser 410 performs image recognition based on the image signal output from the camera 420. The camera 420 can be a CCD camera or a CMOS camera.

In the camera unit 435, filters (not-shown) are provided over the infrared LED 422 and the camera 420. These filters transmit infrared light and do not transmit light having wavelengths other than the infrared wavelength. That is to say, the light received by the camera 420 is only the light emitted from the infrared LED 422 toward the subject, reflected by the subject, and transmitted through the filters. Such use of the filters prevents the camera 420 from being affected by light effects of the pachi-slot game machine 210 or the light effects in the game hall where the pachi-slot game machine 210 is installed. As a result, the camera unit 435 can take a clear image of the subject (player) while blocking the effect of the light other than the infrared light emitted from the infrared LED 422.

In the present embodiment, the emission brightness of the infrared LED 422 is controlled and adjusted by the CPU 412.

<<<Configurations of Pachinko Game Machine 110, Game Media Dispenser 310, Pachi-slot Game Machine 210, Game Media Dispenser 410, and Hall Computer 500>>>

FIG. 6 is a block diagram illustrating general configurations of a pachinko game machine 110, a game media dispenser 310, a pachi-slot game machine 210, a game media dispenser 410, and a hall computer 500.

<<Pachinko Game Machine 110>>

The pachinko game machine 110 includes a main control circuit 150 and an auxiliary control circuit 160. The main control circuit 150 mainly controls the progress of pachinko games in the pachinko game machine 110. The auxiliary control circuit 160 mainly controls the effects on the games in the pachinko game machine 110. The main control circuit 150 and the auxiliary control circuit 160 are electrically connected via I/O ports (not-shown) so that the main control circuit 150 outputs various commands and data to the auxiliary control circuit 160.

<Main Control Circuit 150>

The main control circuit 150 includes a CPU (central processing unit) 152, a ROM (read only memory) 154, and a RAM (random access memory) 156.

The CPU 152 executes various programs for controlling pachinko games. The ROM 154 stores the programs to be executed by the CPU 152, and tables and constants therefor. The RAM 156 temporarily stores data such as parameter values to be used for the CPU 152 to run the programs. The main control circuit 150 of a pachinko game machine 110 is electrically connected with the game media dispenser 310 through an external integrated terminal assembly 350.

The CPU 152, the ROM 154, and the RAM 156 are connected by an input/output bus (not-shown); they can input and output information such as various commands and data with one another through the input and output bus. The main control circuit 150 of a pachinko game machine 110 can send information such as commands and data to the game media dispenser 310, a data display device 360, and a hall computer 500 through the external integrated terminal assembly 350.

<External Integrated Terminal Assembly 350>

The external integrated terminal assembly 350 is electrically connected with both of the pachinko game machine 110 and the game media dispenser 310. The external integrated terminal assembly 350 has various terminals such as connectors. The external integrated terminal assembly 350 is connected with each of the pachinko game machine 110 and the game media dispenser 310 by cables such as a harness.

The pachinko game machine 110 and the game media dispenser 310 can communicate a variety of information such as commands and data.

<Game Media Dispenser 310>

The game media dispenser 310 includes a CPU (central processing unit) 312, a
ROM (read only memory) 314, a RAM (random access memory) 316, and an I/F (interface) 318.

The CPU 312 executes various programs for controlling the game media dispenser 310. The ROM 314 stores the programs to be executed by the CPU 312, and tables and constants therefor. The RAM 316 temporarily stores data such as parameter values to be used for the CPU 312 to run the programs. The I/F 318 is electrically connected with the pachinko game machine 110, the data display device 360, and the hall computer 500. The game media dispenser 310 can communicate with the pachinko game machine 110, the data display device 360, and the hall computer 500 through the I/F 318.

The CPU 312, the ROM 314, the RAM 316, and the I/F 318 are connected by an input/output bus (not-shown); they can input and output information such as various commands and data with one another through the input and output bus. The game media dispenser 310 can send and receive a variety of information such as commands and data to and from the camera 320 and the touch panel 326 through the input/output bus.

<Data Display Device 360>

The data display device 360 is provided on the top of each pachinko game machine 110 in a game hall. The data display device 360 is a device to display game results and a history of games in the associated pachinko game machine 110. For example, it displays daily data, weekly data, and a slump graph. The data display device 360 has operation buttons (not-shown) operable by a player. The player operates an operation button to change information on the display. The player reads the game results and the history of games displayed on the data display device 360 to decide whether to play games with the pachinko game machine 110. Instead of the operation buttons, the data display device 360 may have a touch panel operable by the player. It is sufficient that the device be operable by the player to display desired information.

The data display device 360 may display a QR code to allow the player to store the player's game history to a cellular phone or a smart phone. The data display device 360 may further display services offered by the game hall or media such as a magazine.

<<Pachi-slot Game Machine 210>>

The pachi-slot game machine 210 includes a main control circuit 250 and an auxiliary control circuit 260. The main control circuit 250 mainly controls the progress of pachi-slot games in the pachi-slot game machine 210. The auxiliary control circuit 260 mainly controls the effects on the games in the pachi-slot game machine 210. The main control circuit 250 and the auxiliary control circuit 260 are electrically connected via I/O ports (not-shown) so that the main control circuit 250 outputs various commands and data to the auxiliary control circuit 260.

<Main Control Circuit 250>

The main control circuit 250 includes a CPU (central processing unit) 252, a ROM (read only memory) 254, and a RAM (random access memory) 256.

The CPU 252 executes various programs for controlling pachi-slot games. The ROM 254 stores the programs to be executed by the CPU 252, and tables and constants therefor. The RAM 256 temporarily stores data such as parameter values to be used for the CPU 252 to run the programs. The main control circuit 250 of the pachi-slot game machine 210 is electrically connected with the game media dispenser 410 through an external integrated terminal assembly 450.

The CPU 252, the ROM 254, and the RAM 256 are connected by an input/output bus (not-shown); they can input or output information such as various commands and data with one another through the input and output bus. The main control circuit 250 of a pachi-slot game machine 210 can send information such as commands and data to the game media dispenser 410, a data display device 460, and the hall computer 500 through the external integrated terminal assembly 450.

<External Integrated Terminal Assembly 450>

The external integrated terminal assembly 450 is electrically connected with both of the pachi-slot game machine 210 and the game media dispenser 410. The external integrated terminal assembly 450 has various terminals such as connectors. The external integrated terminal assembly 450 is connected with each of the pachi-slot game machine 210 and the game media dispenser 410 by cables such as a harness. The pachi-slot game machine 210 and the game media dispenser 410 can communicate a variety of information such as commands and data.

<Game Media Dispenser 410>

The game media dispenser 410 includes a CPU (central processing unit) 412, a ROM (read only memory) 414, a RAM (random access memory) 416, and an I/F (interface) 418.

The CPU 412 executes various programs for controlling the game media dispenser 410. The ROM 414 stores the programs to be executed by the CPU 412, and tables and constants therefor. The RAM 416 temporarily stores data such as parameter values to be used for the CPU 412 to run the programs. The I/F 418 is electrically connected with the pachi-slot game machine 210, the data display device 460, and the hall computer 500. The game media dispenser 410 can communicate with the pachi-slot game machine 210, the data display device 460, and the hall computer 500 through the I/F 418.

The CPU 412, the ROM 414, the RAM 416, and the I/F 418 are connected by an input/output bus (not-shown); they can input and output information such as various commands and data with one another through the input and output bus. The game media dispenser 410 can send and receive a variety of information such as commands and data to and from the camera 420 and the touch panel 426 through the input/output bus.

<Data Display Device 460>

The data display device 460 is provided on the top of each pachi-slot game machine 210 in a game hall. The data display device 460 is a device to display game results and a history of games in the associated pachi-slot game machine 210. For example, it displays daily data, weekly data, and a slump graph. The data display device 460 has a touch panel (not-shown) operable by a player. The player operates the touch panel to change information on the display. The player reads the game results and the history of games displayed on the data display device 460 to decide whether to play games with the pachi-slot game machine 210.

The data display device 460 may display a QR code to allow the player to store the player's game history to a cellular phone or a smart phone. The data display device 460 may further display services offered by the game hall or media such as a magazine.

<Hall Computer 500>

The hall computer 500 includes a CPU (central processing unit) 512, a ROM (read only memory) 514, a RAM (random access memory) 516, and an I/F (interface) 518.

The CPU 512 executes various programs for processing a variety of information output from pachinko game machines 110, pachi-slot game machines 210, game media dispensers 310, game media dispensers 410, data display devices 360, and data display devices 460. The ROM 514 stores the programs to be executed by the CPU 512, and tables and constants therefor. The RAM 516 temporarily stores data such as parameter values to be used for the CPU 512 to run the programs. The I/F 518 is electrically connected with the game media dispensers 310, the external integrated terminal assemblies 350, the data display devices 360, the game media dispensers 410, the external integrated terminal assemblies 450, and the data display devices 460. The hall computer 500 can communicate with these apparatuses through the I/F 518.

The hall computer 500 further includes a mass storage medium (not shown) such as an HDD to store a database for managing the sales in the game hall and players.

<<<Layout of Pachi-slot Game Machines 210 and Game Media Dispensers 410 and Locations of Players>>>

FIG. 16 is a schematic diagram illustrating a layout of pachi-slot game machines 210 and game media dispensers 410 and locations of players in a game hall.

As illustrated in FIG. 16, the pachi-slot game machines 210 and the game media dispensers 410 are disposed like islands in a game hall. The first game machine island and the second game machine island are disposed in such an arrangement that players will be located between the first game machine island and the second game machine island. That is to say, the pachi-slot game machines 210 and the game media dispensers 410 constituting the first game machine island and the pachi-slot game machines 210 and the game media dispensers 410 constituting the second game machine island are disposed to face each other.

The infrared LED 422 of each game media dispenser 410 are arranged to emit light toward the front of the pachi-slot game machine 210. That is to say, the infrared LED 422 is arranged to emit light obliquely forward from the game media dispenser 410. Since the infrared light of the infrared LED 422 is emitted toward the front of the pachi-slot game machine 210, the face of the player located in front of the pachi-slot game machine 210 can be illuminated.

Specifically, each of the infrared light A, the infrared light B, the infrared light C, and the infrared light D shown in FIG. 16 is emitted from the infrared LED 422 of a game media dispenser 410 toward the front of the associated pachi-slot game machine 210. The infrared light A reaches the player.

As shown in FIG. 16, the infrared light A is emitted toward the player A from the infrared LED 422 of the game media dispenser 410A in the first game machine island. This infrared light A reaches the player A and blocked by the player A, so that the camera 420 (not shown) of the game media dispenser 410B in the second game machine island does not receive it.

The infrared LED 422 of the game media dispenser 410B in the second game machine island emits infrared light B. However, there is no player to be illuminated with the infrared light B, the infrared light B reaches the back of the player A and further, might be received by the camera 420 (not shown) of the game media dispenser 410A in the first game machine island. Accordingly, when the camera 420 (not shown) of the game media dispenser 410A in the first game machine island takes an image of the player A, the infrared light B is backlight. In the case where infrared light B is emitted all the time even though no player to be illuminated with the infrared light B exists, the infrared light B may be backlight, interfering with taking a clear image of a player's face.

To cope with this problem, infrared light may be changed in brightness to prevent the infrared light from becoming backlight when no player blocks the infrared light. Specifically, the infrared LED 422 of a game media dispenser 410 can be controlled so as to emit infrared light when a player makes some operation and to lower the emission brightness or stop the emission in the other situations. Such control can prevent taking images in backlight.

It should be noted that, although FIG. 16 illustrates game machine islands including pachi-slot game machines 210 and game media dispensers 410, the same applies to game machine islands including pachinko game machines 110 and game media dispensers 310.

<<<Processing in Game Media Dispenser>>>

The following description of processing includes reference numerals in parentheses when describing processing common to the game media dispenser 310 and the game media dispenser 410, as representatively expressed as game media dispenser 310 (410). The same applies to an element common to the game media dispenser 310 and the game media dispenser 410. The common element is expressed with a reference numeral in parenthesis, such as the CPU 312 (412) or the camera 320 (420).

<<Processing at Power-on>>

Figure 7:
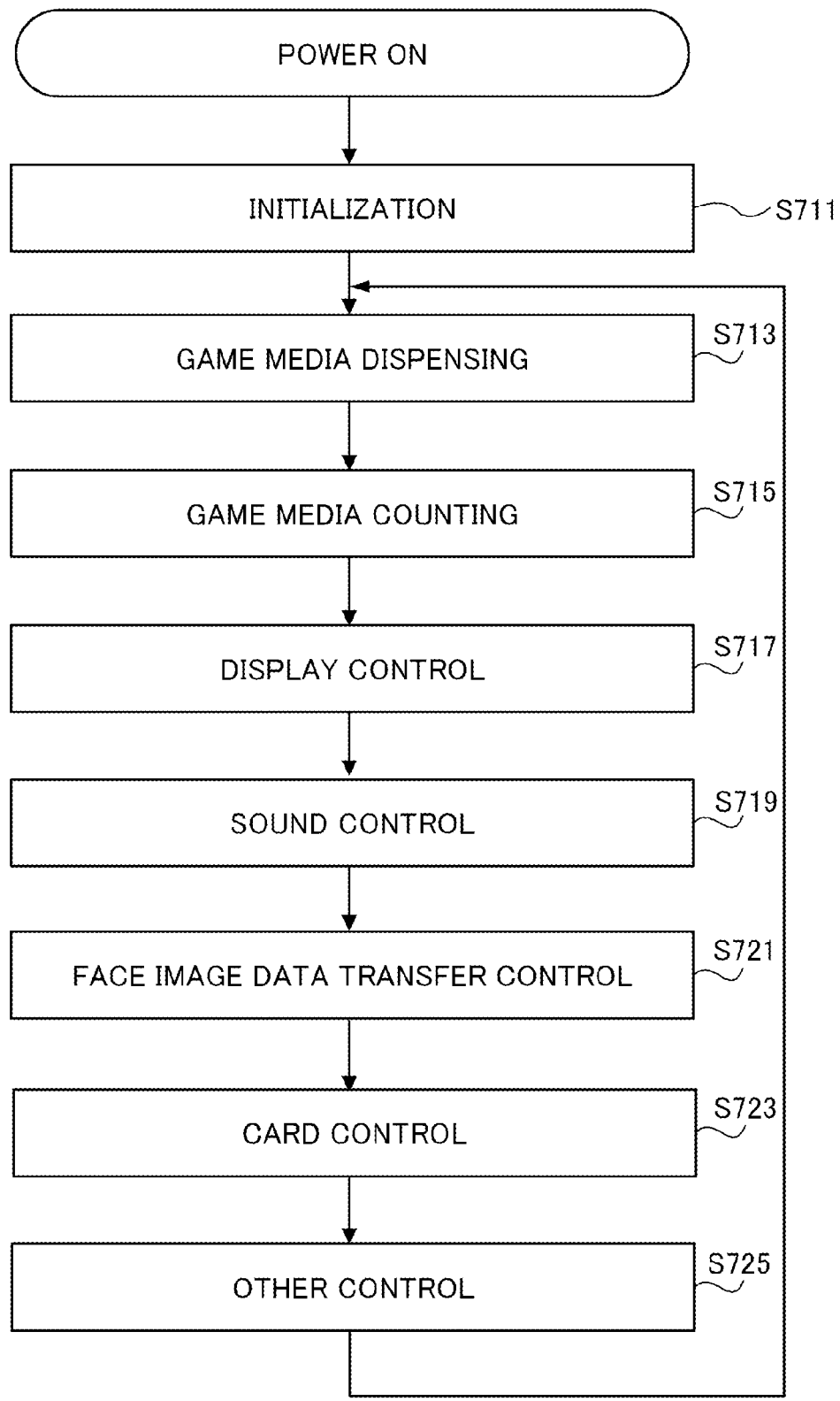

FIG. 7 is a flowchart illustrating processing in the game media dispenser 310 (410) at power-on.

First, the CPU 312 (412) performs initialization (Step S711). This initialization determines whether backing up a variety of data in the game media dispenser 310 (410) has been successful and performs initialization depending on the determination result.

Next, the CPU 312 (412) performs game media dispensing (Step S713). This game media dispensing is dispensing game media to the player upon a press of the DISPENSE button or the REPLAY button on the touch panel 326 (426). The game media are pachinko balls in the case of a game media dispenser 310 and tokens in the case of a game media dispenser 410.

For example, when the player inserts JPY 1,000 into the bill slot 333 (433) and operates the DISPENSE button, the game media dispenser 310 (410) dispenses game media corresponding to JPY 500. Assuming that the player has gained 1,000 balls in the previous games and the information thereof is stored in an information card, the game media dispenser 310 (410) dispenses game media corresponding to 125 balls when the player inserts the information card into the card slot 332 (432) and operates the REPLAY button. The information card includes a membership card and a visitor card. The amount of money, the number of gained balls, and the number of dispensed balls are not limited to these values.

Next, the CPU 312 (412) performs game media counting (Step S715). This game media counting is counting the game media when the COUNT button on the touch panel 326 (426) is pressed by the player.

Next, the CPU 312 (412) performs display control (Step S717). This display control is controlling the display 324 (424) to display information such as the balance on the card, the number of stored balls (stored tokens), the number of owned balls (owned tokens), the DISPENSE button, the REPLAY button, the COUNT button, and the RETURN CARD button. The displaying the information does not need to display all the information on the display 324 (424) at once but preferably, changes the display showing some information with a CHANGE button. For example, changing the display by toggling is preferable for the display control.

Next, the CPU 312 (412) performs sound control (Step S719). The sound control is controlling the sound depending on the status of the game media dispenser 310 (410). For example, it controls a speaker (not shown) to output error sound when an abnormal event occurs or to output audio guidance for the player not to leave an information card when the information card is ejected to be returned to the player.

Next, the CPU 312 (412) performs face image data transfer control (Step S721). The face image data transfer control is transferring face image data taken by the camera 320 (420) from the game media dispenser 310 (410) to the hall computer 500. The hall computer 500 can display the face image data or compare the face image data with previously stored face image data to distinguish the players.

Although the present embodiment transfers still image data to the hall computer 500, video data may be transferred to the hall computer 500. Furthermore, image data acquired by the camera 320 (420) may be transferred to the data display device.

Next, the CPU 312 (412) performs card control (Step S723). The card control is controlling acceptance or return of an information card through the card slot 332 (432).

Next, the CPU 312 (412) performs other control (Step S725). For example, the CPU 312 (412) performs lamp control, control to send information on the counted game media to the data display device 360 (460), or control to change the display showing information in response to the player's operation of the CHANGE button.

<<Interruption at Touch Panel Operation>>

Figure 8:
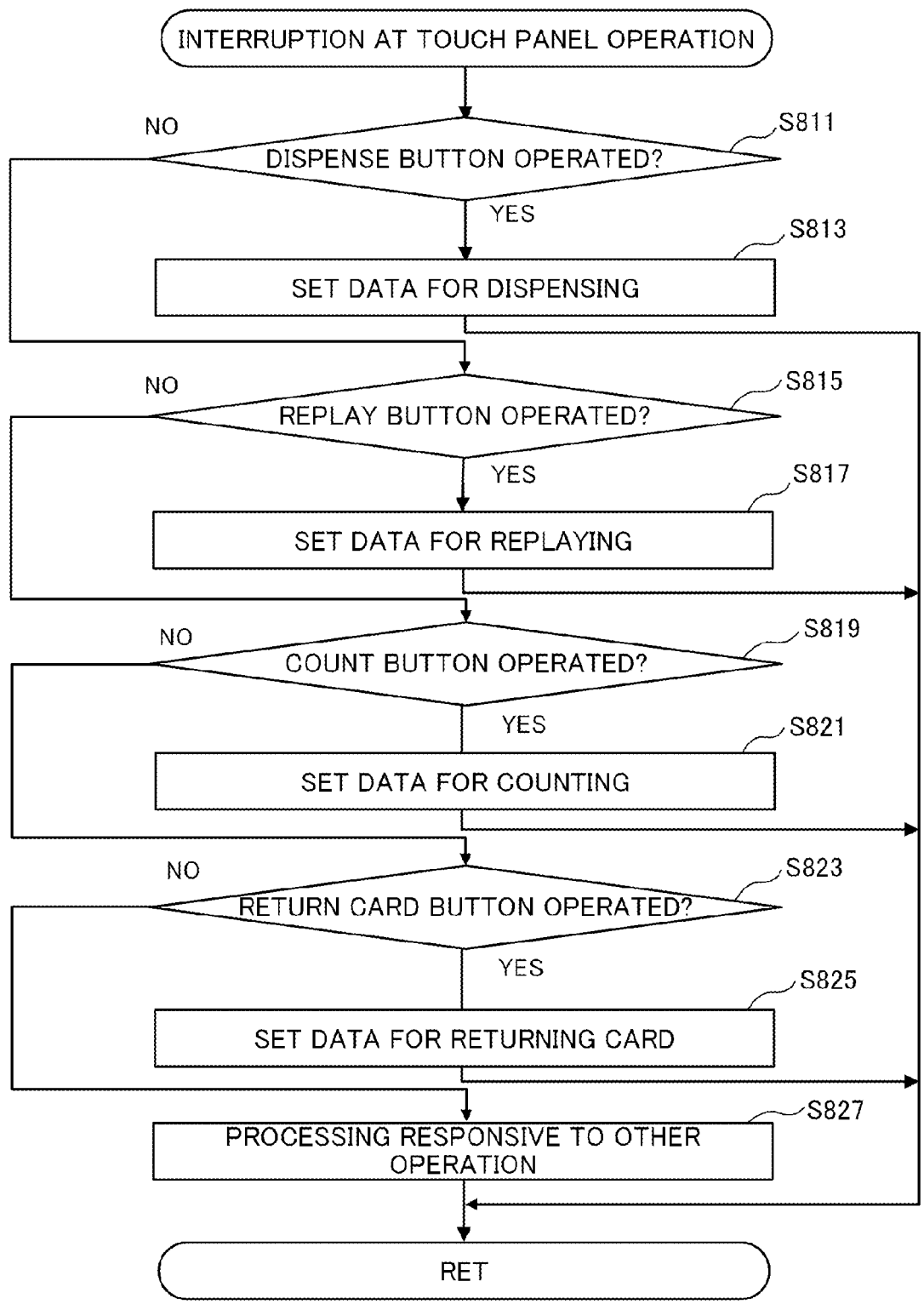
FIG. 8 is a flowchart illustrating processing in the game media dispenser 310 (410) when the touch panel 326 (426) is operated by a player.

FIG. 8 is a flowchart illustrating processing in the game media dispenser 310 (410) when the touch panel 326 (426) is operated by a player.

First, the CPU 312 (412) determines whether the operated by the player on the touch panel 326 (426) is the DISPENSE button. If the determination is that the operated is the DISPENSE button (YES), the CPU 312 (412) sets data to dispense game media (Step S813) and exits the interruption at touch panel operation.

Step S813 is setting data to dispense game media within the range of the credit balance in the information card in response to an operation of the touch panel 326 (426) corresponding to the DISPENSE button. In the case of the game media dispenser 310 (sandwiched dispenser for pachinko game machine), the CPU 312 sets data to dispense pachinko balls equivalent to a predetermined amount of money (for example, JPY 500). In the case of the game media dispenser 410 (sandwiched dispenser for pachi-slot game machine), the CPU 412 sets data to dispense tokens equivalent to a predetermined amount of money (for example, JPY 1,000). If the credit balance is less than the predetermined amount, neither the game media dispenser 310 (sandwiched dispenser for pachinko game machine) nor the game media dispenser 410 (sandwiched dispenser for pachi-slot game machine) dispenses game media; however, they may be configured to dispense game media equivalent to the amount less than the predetermined amount.

If the determination at Step S811 is that the operated is not the DISPENSE button (NO), the CPU 312 (412) determines whether the operated by the player on the touch panel 326 (426) is the REPLAY button (Step S815). If the determination is that the operated is the REPLAY button (YES), the CPU 312 (412) sets data to replay games (Step S817) and exits the interruption at touch panel operation.

Step S817 is setting data to eject, for example, 125 balls (50 tokens) from the owned balls (owned tokens). If owned balls (owned tokens) are less than the foregoing number, the present embodiment ejects all the owned balls (owned tokens); however, the CPU 312 (412) may be configured not to eject balls or tokens when the owned balls (owned tokens) are less than the foregoing number.

If the determination at Step S815 is that the operated is not the REPLAY button (NO), the CPU 312 (412) determines whether the operated by the player on the touch panel 326 (426) is the COUNT button (Step S819). If the determination is that the operated is the COUNT button (YES), the CPU 312 (412) sets data to count the game media (Step S821) and exits the interruption at touch panel operation.

Step S819 is setting data to count the game media accumulated in the counter tray.

If the determination at Step S819 is that the operated is not the COUNT button (NO), the CPU 312 (412) determines whether the operated by the player on the touch panel 326 (426) is RETURN CARD button (Step S823). If the determination is that the operated is the RETURN CARD button (YES), the CPU 312 (412) sets data to return a card (Step S825) and exits the interruption at touch panel operation.

If the determination at Step S823 is that the operated is not the RETURN CARD button (NO), the CPU 312 (412) performs processing responsive to other operation (Step S827) and exits the interruption at touch panel operation.

Step S827 is processing in response to other operation for example, registering a password for a membership card. The Step S827 is processing to attain security.

<<<Embodiment 1>>>

Embodiment 1 provides an example of changing the brightness of the infrared LED 322 (422) to take an image when a membership card or a visitor card is inserted in the card slot 332 (432).

<<Interruption at Card Insertion>>

Figure 9A:
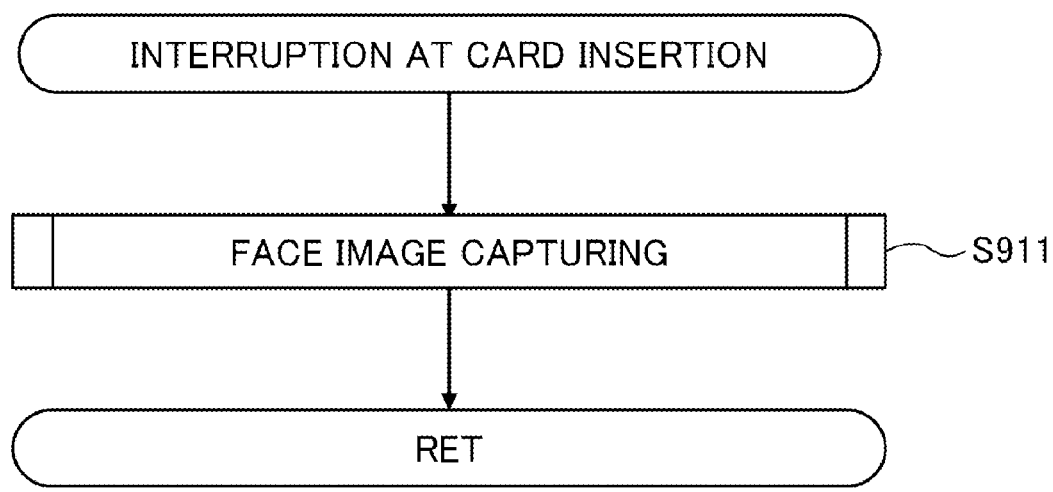
FIG. 9A provides a flowchart illustrating interruption at card insertion performed after generating an interruption in response to insertion of an information card and FIG. 9B provides a flowchart illustrating face image capturing performed invoked and executed at Step S911 in FIG. 9A.

FIG. 9A is a flowchart illustrating interruption at card insertion performed after generating an interruption in response to insertion of an information card. Specifically, the interruption at card insertion is performed when a membership card or a visitor card is inserted into the card slot 332 (432).

The CPU 312 (412) first invokes and executes later-described face image capturing (Step S911) and exits the interruption at card insertion.

<<Face Image Capturing>>

Figure 9B:
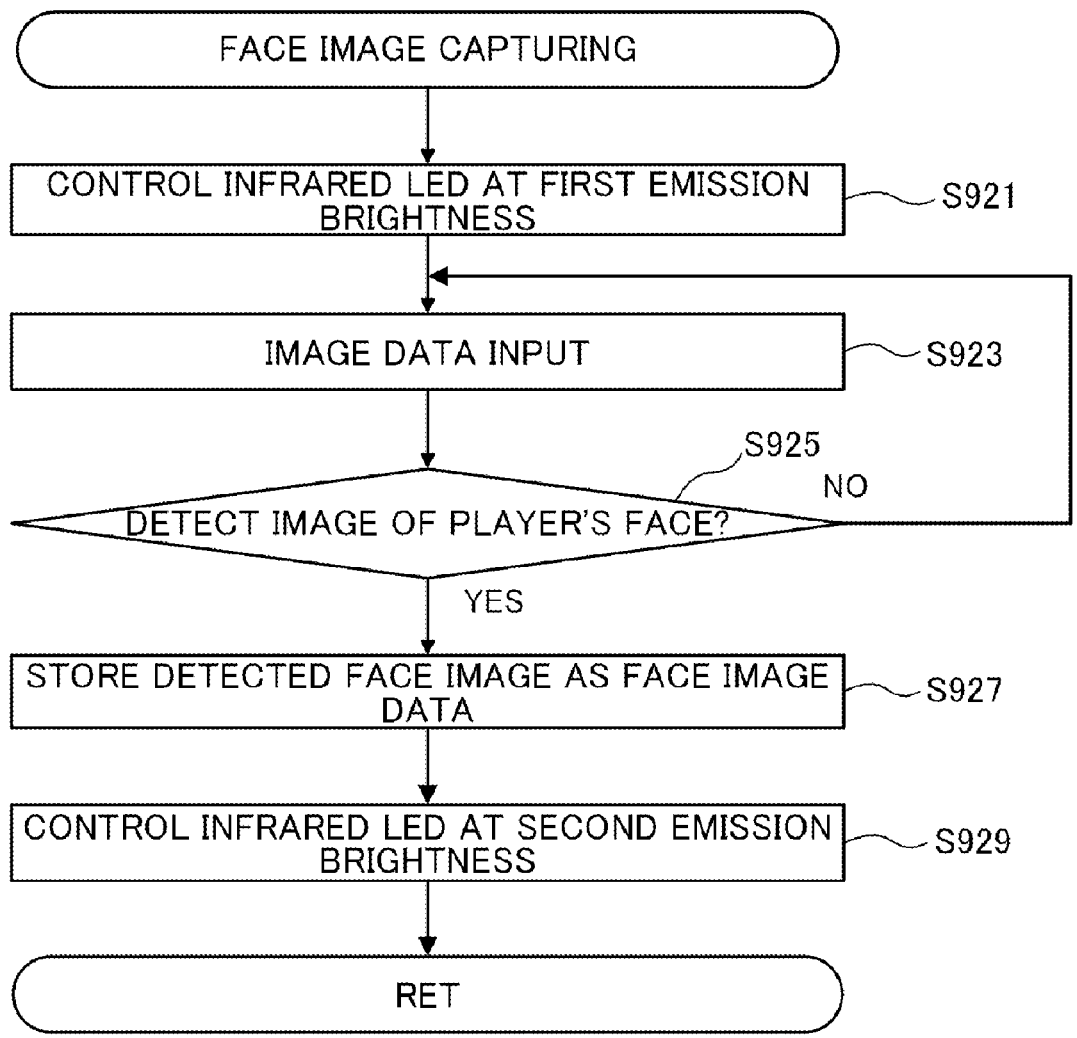

FIG. 9B is a flowchart illustrating face image capturing invoked and executed at Step S911 in FIG. 9A.

First, the CPU 312 (412) controls the infrared LED 322 (422) at first emission brightness (Step S921). This first emission brightness is the highest emission brightness in the emission brightness of the infrared LED 322 (422). Executing Step S921 directs the infrared LED 322 (422) to light at the highest emission brightness.

Next, the CPU 312 (412) executes image data input (Step S923). Step S923 is starting taking an image of the front of the pachinko game machine 110 (pachi-slot game machine 210) with the camera 320 (420) and inputting image data created by taking an image to the game media dispenser 310 (410). The taking an image with the camera 320 (420) is performed successively; the image data created by taking an image is successively input to the game media dispenser 310 (410). Preferably, the taking images with the camera 320 (420) is terminated after later-described Step S929.

As described above, the camera 320 (420) may be made of a CCD camera or a CMOS camera. The camera may be any kind as far as it can take an image of the face of a player located in front of the pachinko game machine 110 (pachi-slot game machine 210).

Next, the CPU 312 (412) determines whether an image of a player's face is detected (Step S925). If a player is in front of the pachinko game machine 110 (pachi-slot game machine 210), the camera 320 (420) can take an image of the player's face. If predetermined conditions to take an image are satisfied at this time, the image data created by taking an image includes data indicating the player's face. For example, if the player's face is in a capture range of the camera 320 (420), if an image of the player's face can be taken without blur as the player does not move the face, and if the player is illuminated sufficiently brightly, the image data includes data indicating the player's face. Thus, if the image data created by taking an image includes data indicating a player's face, the CPU 312 (412) can detect a player's face by processing the image data. Step S925 is determining whether a player's face can be detected from the image data created by taking an image. Accordingly, if the CPU 312 (422) can detect an image of a player's face, it can determine that a player is in front of the pachinko game machine 110 (pachi-slot game machine 210); if the CPU 312 (412) cannot detect an image of a player's face, it can determine that no player is in front of the pachinko game machine 110 (pachi-slot game machine 210).

If the determination at Step 925 is that no image of a player's face is detected, the CPU 312 (412) returns to Step S923.

If the determination at Step S925 is that an image of a player's face is detected, the CPU 312 (412) stores the detected image data indicating a player's face in the RAM 316 (416) as face image data (Step S927).

At Step S927, the CPU 312 (412) may store the face image data in the RAM 316 (416) in association with a card ID. The card ID is information stored in a membership card or a visitor card to function as identification information to identify the player. Associating the face image data with a card ID enables management of the player's face tied with the player.

Next, the CPU 312 (412) controls the infrared LED 322 (422) at second emission brightness (Step S929) and exits this subroutine. This second emission brightness is lower than the first emission brightness. For example, the second emission brightness is the lowest emission brightness in the emission brightness of the infrared LED 322 (422). Execution of Step S929 directs the infrared LED 322 (422) to light at the lowest emission brightness.

In the present embodiment, the second emission brightness is sufficient if it is lower than the first emission brightness; the second emission brightness includes the brightness in the off-state where the infrared LED 322 (422) does not light. Accordingly, Step S929 may be turning off the infrared LED 322 (422).

As described above, Embodiment 1 is an example that changes the emission brightness of the infrared LED 322 (422) upon detection of insertion of a membership card or a visitor card into the card slot 332 (432). It should be noted that, if face image data corresponding to the detected face image is already stored in the information card, Embodiment 1 does not need to store the images taken with the camera 320 (420). The face image data may be stored in the hall computer 500 in addition to the information card such as the membership card or the visitor card. It is satisfactory if face image data be stored in a storage medium so as to be able to manage the players.

According to Embodiment 1, the CPU 312 (412) controls the brightness of the infrared LED 322 (422) at the second emission brightness at Step S929 and changes the brightness of the infrared LED 322 (422) to the first emission brightness at Step S921 to take an image of the player. Accordingly, the CPU 312 (412) usually keeps the emission brightness of the infrared LED 322 (422) at the second emission brightness (low brightness) and changes the emission brightness of the infrared LED 322 (422) to the first emission brightness (high brightness) when the player inserts a membership card or a visitor card into the card slot 332 (432). That is to say, for only the time to take an image of the player's face, the emission brightness of the infrared LED 322 (422) is changed to the first emission brightness (high brightness) in response to insertion of a membership card or a visitor card into the card slot 332 (432), and during the other time, it can be kept at the second emission brightness (low brightness). Such control achieves adequate capturing the player's face even in a dim game hall and extends the life of infrared LED 322 (422). Furthermore, the second emission brightness (low brightness) can save electric power consumption.

In the above-described determination at Step S925 in FIG. 9B, if an image of a player's face cannot be detected within a predetermined number of attempts, the CPU 312 (412) may output an error signal indicating that detection of an image of a player's face is failed to the hall computer 500 or exit the interruption at card insertion illustrated in FIG. 9A.

<<<Embodiment 2>>>

Embodiment 2 is an example that inputs image data all the time and, in response to detection of a face image, changes the emission brightness of the infrared LED 322 (422).

<<Interruption to Image Data Input>>

Figure 10:
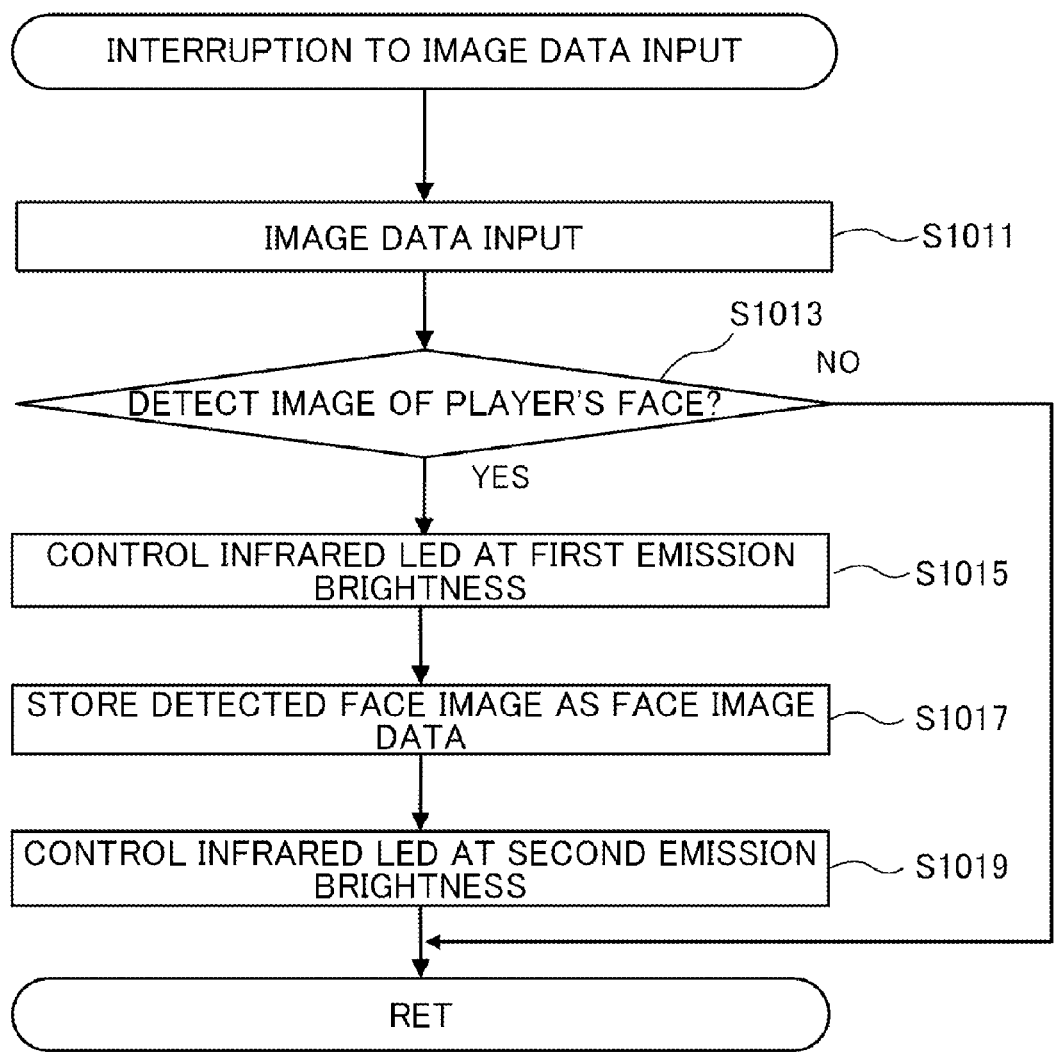
FIG. 10 is a flowchart illustrating interruption to image data input.

FIG. 10 is a flowchart illustrating interruption to image data input. The interruption to image data input is performed at every predetermined interval.

First, the CPU 312 (412) executes image data input (Step S1011). Step S1011 is starting taking an image of the front of the pachinko game machine 110 (pachi-slot game machine 210) with the camera 320 (420) and inputting image data created by taking an image to the game media dispenser 310 (410). The taking an image with the camera 320 (420) is performed successively; the image data created by taking an image is successively input to the game media dispenser 310 (410). Preferably, the taking images with the camera 320 (420) is terminated together with the end of this interruption to image data input illustrated in FIG. 10.

Next, the CPU 312 (412) determines whether an image of a player's face is detected (Step S1013). Like Step S925, Step S1013 is determining whether a player's face can be detected in the image data created by taking an image. If conditions of the camera 320 (420) to take an image satisfy predetermined conditions to take an image, the image data created by taking an image includes data indicating the player's face. For example, if the player's face is in a capture range of the camera 320 (420), if an image of the player's face can be taken without blur as the player does not move the face, and if the player is illuminated sufficiently brightly, the image data includes data indicating the player's face. Accordingly, if the CPU 312 (412) can detect an image of a player's face, the predetermined conditions to take an image are satisfied; the CPU 312 (412) can determine that a player is in front of the pachinko game machine 110 (pachi-slot game machine 210). If the CPU 312 (412) cannot detect an image of a player's face, the predetermined conditions to take an image are not satisfied; the CPU 312 (412) can determine that no player is in front of the pachinko game machine 110 (pachi-slot game machine 210).

If the determination at Step S1013 is that no image of a player's face is detected (NO), the CPU 312 (412) immediately exits the interruption to image data input. Contrarily, if the determination at Step S1013 is that an image of a player's face is detected (YES), the CPU 312 (412) controls the infrared LED 322 (422) at the first emission brightness (Step S1015). This first emission brightness is the highest emission brightness in the emission brightness of the infrared LED 322 (422). Executing Step S1015 directs the infrared LED 322 (422) to light at the highest emission brightness.

Since taking images of the front of the pachinko game machine 110 (pachi-slot game machine 210) has been started at the foregoing Step S1011, the camera 320 (420) can take an image of the front of the pachinko game machine 110 (pachi-slot game machine 210) with the infrared LED 322 (422) lighting at the highest emission brightness.

Next, the CPU 312 (412) stores the image data indicating the player's face detected at Step S1013 in the RAM 316 (416) as face image data (Step S1017).

Subsequently, the CPU 312 (412) controls the infrared LED 322 (422) at the second emission brightness (Step S1019) and exits this subroutine. This second emission brightness is lower than the first emission brightness. For example, the second emission brightness is the lowest emission brightness in the emission brightness of the infrared LED 322 (422). Execution of Step S1019 directs the infrared LED 322 (422) to light at the lowest emission brightness.

Like in Embodiment 1, the second emission brightness in the present embodiment is sufficient if it is lower than the first emission brightness; the second emission brightness includes the brightness in the off-state where the infrared LED 322 (422) does not light. Accordingly, Step S1019 may be turning off the infrared LED 322 (422).

This interruption to the image data input leads to successively taking images of the front of the pachinko game machine 110 (pachi-slot game machine 210) at predetermined intervals. If an image of a player's face can be detected in the course of taking images at predetermined intervals, the CPU 312 (412) changes the emission brightness of the infrared LED to the first emission brightness and after storing the face image data, it changes the emission brightness of the infrared LED to the second emission brightness.

Embodiment 2 is processing for a bright game hall. That is to say, the CPU 312 (412) does not change the emission brightness of the infrared LED 322 (422) until an image of a player's face is detected in the determination at Step S1013 in FIG. 10. Then, it changes the emission brightness of the infrared LED 322 (422) to the first emission brightness (high brightness) at Step S1015. Such a control attains a clearer image of a player's face.

In the foregoing determination at Step S1013 in FIG. 10, if an image of a player's face cannot be detected within a predetermined number of attempts, the CPU 312 (412) may output an error signal indicating that detection of an image of a player's face is failed to the hall computer 500 or exit the interruption to image data input illustrated in FIG. 10.

<<<Embodiment 3>>>

Embodiment 3 is an example of processing in a pachi-slot game machine 210 and a game media dispenser 410.

<<Processing in Pachi-slot Game Machine 210>>
<Signal Output>

Figure 11:
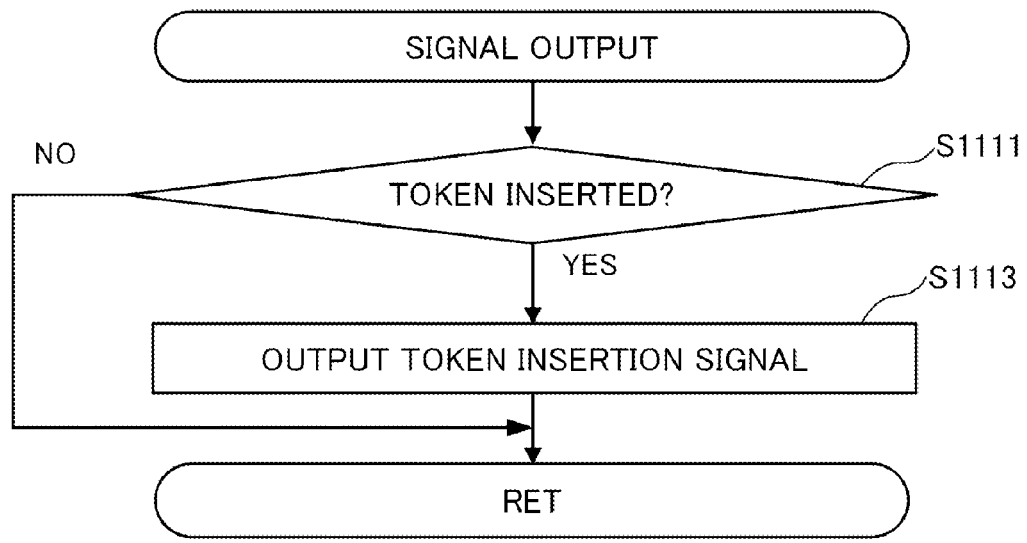
FIG. 11 is a flowchart illustrating signal output in a pachi-slot game machine 210.

FIG. 11 is a flowchart illustrating signal output in a pachi-slot game machine 210. This signal output is outputting a signal from a pachi-slot game machine 210 to a game media dispenser 410 via an external integrated terminal assembly 450.

First, the CPU 252 of the pachi-slot game machine 210 determines whether a token has been inserted into the pachi-slot game machine 210 by a player (Step S111). This determination at Step S1111 determines that a token has been inserted when a token is inserted into the slot (not-shown) of the pachi-slot game machine 210 or when a bet button (not-shown) of the pachi-slot game machine 210 is operated.

If the determination is that no token has been inserted into the pachi-slot game machine 210 by a player (NO), the CPU 252 immediately exits the signal output.

If the determination is that a token has been inserted into the pachi-slot game machine 210 by a player (YES), the CPU 252 executes processing to output a token insertion signal indicating that a token has been inserted into the game media dispenser 410 (Step S1113) and exits the signal output.

The foregoing example has described a case in which a token insertion signal indicating that a token has been inserted is output to the game media dispenser 410; however, the CPU 252 may output a payout signal indicating that tokens have been paid out to the game media dispenser 410 when tokens are paid out. Furthermore, the CPU 252 may output a BB signal indicating that a BB (big bonus) has been won to the game media dispenser 410 when a BB is won. Yet further, the CPU 252 may output an RT start signal indicating that an RT (replay time) starts to the game media dispenser 410 when an RT starts.

<<Processing in Game Media Dispenser 410>>
<Interruption at Signal Reception>

Figure 12A:
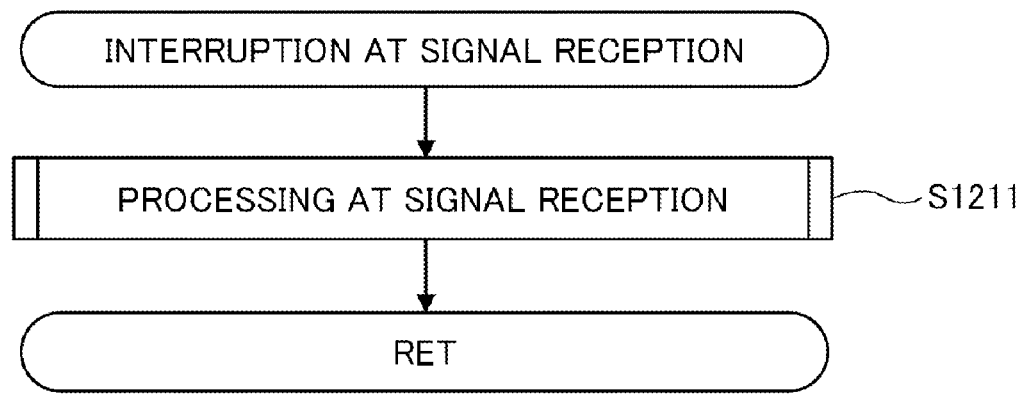
FIG. 12A provides a flowchart illustrating interruption at signal reception in the game media dispenser 410 and FIG. 12B provides a subroutine of processing at signal reception invoked and executed at Step S1211 in FIG. 12A.

FIG. 12A is a flowchart illustrating interruption at signal reception in the game media dispenser 410. This interruption at signal reception is performed by generating an interruption when a signal output from the pachi-slot game machine 210 is received.

Figure 12B:
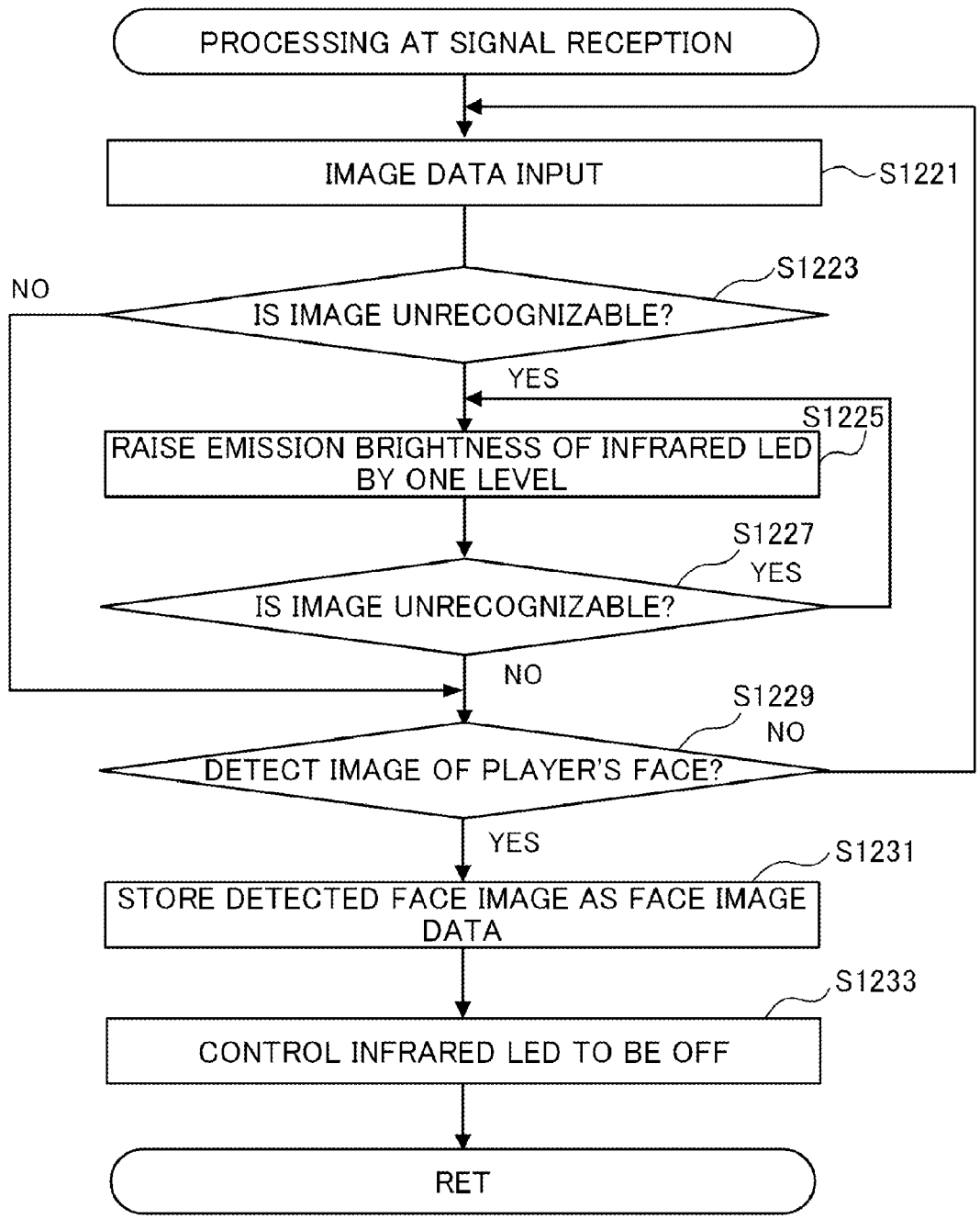

First, the CPU 412 of the game media dispenser 410 invokes and executes processing at signal reception illustrated in FIG. 12B (Step S1211) and exits the interruption at signal reception.

Although Embodiment 1 takes a face image upon detection of insertion of an information card, this Embodiment 3 takes an image upon receipt of a token insertion signal output from the pachi-slot game machine 210.

<Processing at Signal Reception>

FIG. 12B illustrates a subroutine of the processing at signal reception invoked and executed at Step S1211 in FIG. 12A.

First, the CPU 412 of the game media dispenser 410 performs image data input (Step S1221). At Step S1221, the CPU 412 instructs the camera 420 to take an image of the front of the pachi-slot game machine 210 and input the image data created by taking an image to the game media dispenser 410.

Although the infrared LED 422 is preset to high emission brightness in Embodiment 1, Embodiment 3 starts from the image data input at Step S1221 without pre-adjustment of the brightness.

Next, the CPU 412 of the game media dispenser 410 determines whether an image is unrecognizable from the image data input at Step S1221 (Step S1223).

If the determination at Step S1223 is that an image is unrecognizable (YES), meaning that the illumination is not bright enough to recognize the player, the CPU 412 of the game media dispenser 410 raises the emission brightness of the infrared LED 422 by one level (Step S1225). This Step S1225 leads the infrared LED 422 to light at the emission brightness one level higher.

For example, a plurality of levels are predefined for the emission brightness of the infrared LED 422. For example, four levels of emission brightness, a low level, a middle level, a high level, and an off level, may be defined. Including the off level in the emission brightness levels allows a selection of not lighting the infrared LED 422 to further extend the life of the infrared LED 422. Step S1225 is raising the emission brightness by one level. Although the foregoing example has provided four levels for the emission brightness, the number of levels for the emission brightness is not limited to four as far as it is a plural number.

Next, the CPU 412 of the game media dispenser 410 determines whether the image is unrecognizable (Step S1227). If the determination is that the image is unrecognizable (YES), meaning that the illumination is not bright enough to recognize the player, the CPU 412 of the game media dispenser 410 returns to Step S1225. Returning to Step S1225 leads to raising the emission brightness of the infrared LED 422 by one more level. In this way, when the image is unrecognizable, the CPU 412 raises the emission brightness level again.

If the determination at Step S1223 or S1227 is that the image is not unrecognizable (NO), meaning that the player in front of the pachi-slot game machine 210 can be recognized, the CPU 412 of the game media dispenser 410 determines whether an image of the player's face can be detected (Step S1229). This step is, like in Embodiment 1, determining whether the player's face can be detected through image processing on the image data.

In the foregoing Steps S1223 to S1227, if the subject can be recognized at the phase of the determination of Step S1223 (a recognizable image of the player can be obtained without changing the emission brightness), the CPU 412 of the game media dispenser 410 proceeds to detecting an image of the player's face (Step S1229) without changing the emission brightness. Contrarily, if the player cannot be recognized because of dimness at the determination of Step S1223, it proceeds to raising the emission brightness (S1225).

If the determination at Step S1229 is that an image of the player's face cannot be detected (NO), the CPU 412 of the game media dispenser 410 returns to Step S1221 and repeats the Steps S1221 to S1227.

If the determination at Step S1229 is that an image of the player's face can be detected (YES), the CPU 412 of the game media dispenser 410 stores the detected face image in the RAM 416 as face image data (Step 1231).

Next, the CPU 412 of the game media dispenser 410 turns off the infrared LED 422 (Step S1233) and exits the processing at signal reception.

It should be noted that, at Step S1233, the CPU 412 of the game media dispenser 410 may lower the emission brightness of the infrared LED 422, instead of turning off the infrared LED 422. Lowering the emission brightness can also extend the life of the infrared LED 422. Lowering the emission brightness can also save the electric power consumption.

Although the foregoing Embodiment 3 has provided an example that inputs image data (takes an image with the camera 420) every receipt of a token insertion signal, the timing to take an image is not limited to this example. For example, the CPU 412 may control the camera 420 to take an image upon receipt of an insertion signal for a predetermined number of times or upon receipt of a payout signal subsequent to an insertion signal.

In the foregoing determination at Step 1229 of FIG. 12B, if an image of the player's face cannot be detected within a predetermined number of attempts, the CPU 412 of the game media dispenser 410 may output an error signal indicating that detection of an image of the player's face is failed to the hall computer 500 or exit the interruption at signal reception of FIG. 12A.

<<<Embodiment 4>>>

Embodiment 4 is an example of processing in a pachinko game machine 110 and a game media dispenser 310. Specifically, Embodiment 4 activates a timer after turning off the infrared LED 322 to keep the infrared LED 322 not to light while the timer is working even if a winning-triggered signal is received. Since triggering of winning happens frequently, taking an image at every triggering of winning complicates the processing; the timer eliminates such complicated processing.

<<Processing in Pachinko Game Machine 110>>
<Signal Output>

Figure 13:
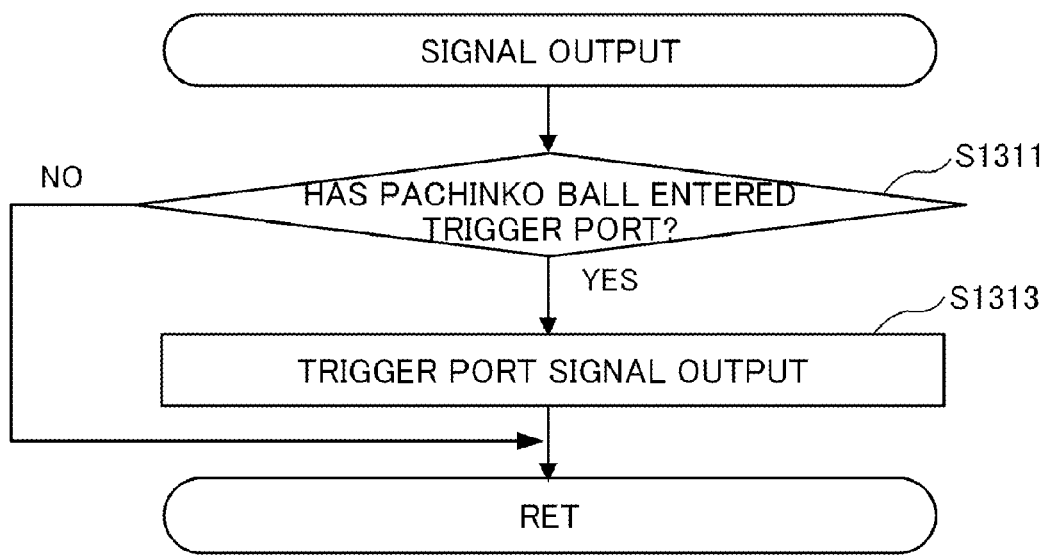
FIG. 13 is a flowchart illustrating signal output in a pachinko game machine 110.

FIG. 13 is a flowchart illustrating signal output in a pachinko game machine 110. This signal output is outputting a signal from a pachinko game machine 110 to a game media dispenser 310 via an external integrated terminal assembly 350.

First, the CPU 152 of the pachinko game machine 110 determines whether a pachinko ball has entered a trigger port provided in the pachinko game machine 110 (Step S1311).

If the determination is that no pachinko ball has entered a trigger port (NO), the CPU 152 of the pachinko game machine 110 immediately exits the signal output.

If the determination is that a pachinko ball has entered a trigger port (YES), the CPU 152 of the pachinko game machine 110 executes processing to output a trigger port signal indicating that a pachinko ball has entered a trigger port to the game media dispenser 310 (Step S1313) and exits the signal output.

The foregoing example has described a case in which a trigger port signal indicating that a pachinko ball has entered a trigger port to the game media dispenser 310; however, the CPU 152 may output a jackpot signal indicating that a jackpot has been won to the game media dispenser 310 when a jackpot is won. In addition, the CPU 152 may output a special symbol determination signal indicating that a special symbol has been determined to the game media dispenser 310 when the special symbol appears. Furthermore, the CPU 152 may output an error signal indicating that an error has occurred to the game media dispenser 310 when an error occurs. Still Further, the CPU 152 may output a shot signal indicating that a pachinko ball has been shot to the game media dispenser 310 when a pachinko ball is shot. Yet further, the CPU 152 may output an out signal indicating that a pachinko ball has entered a losing port to the game media dispenser 310 when a pachinko ball enters a losing port. Yet further, the CPU 152 may also output a safe signal indicating that a pachinko ball has entered a winning port to the game media dispenser 310 when a pachinko ball enters a wining port.

<<Processing in Game Media Dispenser 310>>
<Interruption at Signal Reception>

FIG. 14A is a flowchart illustrating interruption at signal reception in the game media dispenser 310. This interruption at signal reception is performed by generating an interruption when a signal output from the pachinko game machine 110 is received.

First, the CPU 312 of the game media dispenser 310 invokes and executes processing at signal reception illustrated in FIG. 14A (Step S1411) and exits the interruption at signal reception.

Through this processing, the game media dispenser 310 in Embodiment 4 takes an image upon receipt of a trigger port signal output from the pachinko game machine 110.

<Processing at Signal Reception>

FIG. 15 illustrates a subroutine of the processing at signal reception invoked and executed at Step S1411 in FIG. 14A.

First, the CPU 312 of the game media dispenser 310 determines whether the timer is running (Step S1511). The timer is updated in the later-described processing in FIG. 14B. If the determination is that the timer is running (YES), the CPU 312 of the game media dispenser 310 immediately exits the processing at signal reception.

If the timer has been set for a predetermined time (later-described Step S1527) after turning-off control (later-described Step S1525), the CPU 312 of the game media dispenser 310 exits the processing at signal reception.

Contrarily, if the determination is that the timer is not running (NO), the CPU 312 of the game media dispenser 310 performs image data input (Step S1513). At Step S1513, the CPU 312 instructs the camera 320 to take an image of the front of the pachinko game machine 110 and input the image data created by taking an image to the game media dispenser 310.

Next, the CPU 312 of the game media dispenser 310 determines whether an image is unrecognizable from the image data input at Step S1513 (Step S1515).

If the determination at Step S1515 is that an image is unrecognizable (YES), meaning that the illumination is not bright enough to recognize the player, the CPU 312 of the game media dispenser 310 raises the emission brightness of the infrared LED 322 by one level (Step S1517). This Step S1517 leads the infrared LED 322 to light at the emission brightness one level higher.

For example, like in Embodiment 3, a plurality of levels are predefined for the emission brightness of the infrared LED 322. For example, four levels of emission brightness, a low level, a middle level, a high level, and an off level, may be defined. Including the off level in the emission brightness levels allows a selection of not lighting the infrared LED 322, extending the life of the infrared LED 322 more. Step S1517 is raising the emission brightness by one level. Although the foregoing example has provided four levels for the emission brightness, the number of levels for the emission brightness is not limited to four as far as it is a plural number.

Next, the CPU 312 of the game media dispenser 310 determines whether the image is unrecognizable (Step S1519). If the determination is that the image is unrecognizable (YES), meaning that the illumination is not bright enough to recognize the player, the CPU 312 of the game media dispenser 310 returns to Step S1517. Returning to Step S1517 leads to raising the emission brightness of the infrared LED 322 by one more level. In this way, when the image is unrecognizable, the CPU 312 raises the emission brightness level again.

If the determination at Step S1515 or S1519 is that the image is not unrecognizable (NO), meaning that the player in front of the pachinko game machine 110 can be recognized, the CPU 312 of the game media dispenser 310 determines whether an image of the player's face can be detected (Step S1521). This step is, like in Embodiment 1, determining whether the player's face can be detected through image processing on the image data.

In the foregoing Steps S1515 to S1521, if the subject can be recognized at the phase of the determination of Step S1515 (a recognizable image of the player can be obtained without changing the emission brightness), the CPU 312 of the game media dispenser 310 proceeds to detecting an image of the player's face (Step S1521) without changing the emission brightness. Contrarily, if the player cannot be recognized because of dimness at the determination of Step S1515, it proceeds to raising the emission brightness (S1517).

If the determination at Step S1521 is that an image of the player's face cannot be detected (NO), the CPU 312 of the game media dispenser 310 returns to Step S1513 and repeats the Steps 1513 to S1521.

If the determination at Step S1521 is that an image of the player's face can be detected (YES), the CPU 312 of the game media dispenser 310 stores the detected face image in the RAM 316 as face image data (Step 1523).

Next, the CPU 312 of the game media dispenser 310 turns off the infrared LED 322 (Step S1525).

Figure 14B:
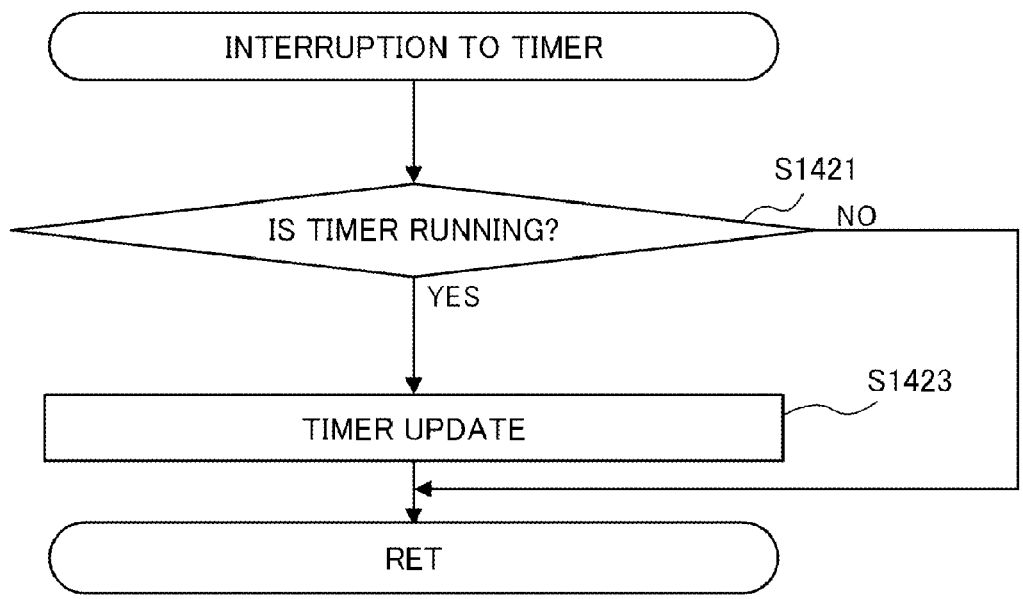

Next, the CPU 312 of the game media dispenser 310 sets the timer for a predetermined time, for example 60 seconds (Step S1527) and exits the processing at signal reception.
<Interruption to Timer>
FIG. 14B is a flowchart illustrating interruption to timer performed after generating an interruption at predetermined intervals.

The CPU 312 of the game media dispenser 310 determines whether the timer is running (Step S1421). If the determination is that the timer is not running (NO), it immediately exits this subroutine.

If the determination is that the timer is running (YES), the CPU 312 of the game media dispenser 310 executes timer update (Step S1423) and exits the interruption to timer. This Step S1423 is updating the timer set in the processing at signal reception.

This Embodiment 4 sets a timer (Step S1527) at turning off the infrared LED 322 (Step S1525) and does not light the infrared LED 322 when the timer is running (YES at Step S1511) to save the electric power consumption. Although Embodiment 4 sets a timer at turning off the infrared LED 322, the CPU 312 of the game media dispenser 310 may set the timer at lighting the infrared LED 322 and turn off the infrared LED 322 when the timer indicates 0, or lower the brightness step by step depending on the remaining time of the timer and keep taking images of the player's face while the infrared LED 322 is lighting. The CPU 312 of the game media dispenser 310 may determine the time to be set to the timer depending on the type of signal output from the pachinko game machine 110. The timer may be set using an apparatus such as the pachinko game machine 110, the game media dispenser 310, or the hall computer 500.

In the foregoing determination at Step S1521 of FIG. 15, if an image of the player's face cannot be detected within a predetermined number of attempts, the CPU 312 of the game media dispenser 310 may output an error signal indicating that detection of an image of the player's face is failed to the hall computer 500 or exit the interruption at signal reception of FIG. 14A.
<<<Modified Example>>>
For the lighting device, a lighting device having multiple LEDs for emitting light of different wavelengths can be employed instead of a lighting device for emitting light of a single wavelength. In the case of using such a lighting device, different colors of light can be selectively emitted by selecting an LED to light.

In the foregoing embodiments, the imaging device (camera 320 or 420) and the lighting device (infrared LED 322 or 422) are provided in the game media dispenser 310 or 410; however, the imaging device and the emitting device may be provided in equipment in a game hall, such as the game machine (pachinko game machine 110 or the pachi-slot game machine 210), the data display device 360 or 460, the hall computer 500, a card issuing machine (not shown), or a checkout machine (not shown).

The face image data taken by the imaging device (camera 320 or 420) may be tied with the card ID of a membership card or a visitor card and sent to the hall computer 500 to be managed. Such a configuration enables management of face image data in association with card IDs of identification information for identifying players.

The requirements provided in the foregoing Embodiments 1 to 4 may be combined as appropriate to create requirements to change the emission brightness of the lighting device. For example, the emission brightness of the lighting device (infrared LED 322 or 422) may be changed based on acceptance of an information card (Embodiment 1) and input of a token insertion signal (Embodiment 3). In similar, the emission brightness of the lighting device (infrared LED 322 or 422) may be changed based on acceptance of an information card (Embodiment 1) and output of a trigger port signal (Embodiment 4). Furthermore, the emission brightness of the lighting device (infrared LED 322 or 422) may be changed based on detection of an image of a player's face (Embodiment 2) and satisfying another requirement (Embodiment 1, 3, or 4).

The apparatuses such as the game media dispenser 310 or 410, the game machine (pachinko game machine 110 or pachi-slot game machine 210), the data display device 360 or 460, the hall computer 500, a card issuing machine (not shown), and a checkout machine (not shown) may be linked and a lighting device provided in one of these apparatuses may be forcibly lit or turned off by operating an operating device in any one of these apparatuses.

The foregoing embodiments have provided examples that change the emission brightness of the infrared LED 322 or 422 in accordance with a brightness determination signal, which may be a signal output from the camera 320 in the game media dispenser 310, the camera 420 in the game media dispenser 410, the touch panel 326 of the game media dispenser 310, the touch panel 426 of the game media dispenser 410, the pachinko game machine 110, or the pachi-slot game machine 210. However, a brightness determination signal may be output from the data display device 360 or 460 which has detected an operation of a player on the data display device 360 or 460 and the emission brightness of the infrared LED 322 or 422 may be changed in accordance with the signal.

The foregoing embodiments use the emission brightness as a physical value representing the brightness of light emitted from the infrared LED 322 or 422; however, some other physical value may be used as far as it indicates the brightness of the light emitted from the infrared LED 322 or 422.

<<<Other Embodiments>>>
<<Gaming Machine 1010>>

FIG. 17 is a perspective view illustrating an appearance of a gaming machine 1010.

For a gaming machine 1010, coins, bills (in a basic currency and currencies other than the basic currency), and/or electronic valuable information equivalent to these are used as game media. In providing a dividend in accordance with a game result, the gaming machine 1010 can write credit information to an IC card, instead of giving coins, to provide the dividend to the player.

The gaming machine 1010 includes a cabinet 1011, an image display panel 1016 provided on the top of the cabinet, and a front door 1013 provided on the front of the lower part of the cabinet 1011.

The image display panel 1016 includes a transparent liquid crystal panel to display multiple display blocks 1028. Each of the display blocks 1028 shows a symbol. Although not shown, the image display panel 1016 displays various images related to presentation effects in addition to the foregoing images.

The image display panel 1016 provides a credit indicator 1031 and a payout indicator 1032. The credit indicator 1031 indicates the number of credited coins as an image. The payout indicator 1032 indicates the number of coins to be paid out as an image. Upon insertion of an IC card through a later-described card slot, instead of insertion of a coin, the credit indicator 1031 indicates credit information retrieved from the inserted IC card; the indicated credit is used as coins. Also, in writing the credit to an IC card instead of paying out coins, the payout indicator 1032 indicates the credit to be written to the IC card.

On the front surface of the image display panel 1016, a touch panel is provided, which is not shown; a player can input various instructions by operating this touch panel.

The cabinet 1011 has speakers 1029 for providing sound effects in accordance with the progress of the games.

On the lower part of the image display panel 1016, a control panel 1020 including a plurality of buttons 1023 to 1027 for a player to input instructions about the progress of the games, a coin slot 1021 to receive coins into the cabinet 1011, and a bill validator 1022 are provided.

<<PTS Terminal 1064>>

FIG. 18 is a perspective view illustrating a PTS terminal 1064. FIG. 19 is a block diagram illustrating a configuration of the PTS terminal 1064.

As shown in FIG. 17, between the image display panel 1016 and the control panel 1020, a section for a PTS (player tracking system) terminal (PTS terminal section 1100) is provided. In the PTS terminal area 1100, a PTS terminal 1064 is disposed.

The PTS terminal 1064 is a device for receiving a variety of information from a management server block 1220 (FIG. 20) and providing the information to a specific player.

The management server block 1220 includes, as illustrated in FIG. 20, a casino hall server 1261, a currency exchange server 1262, a casino/hotel staff management server 1260, a member management server 1264, an IC card/money management server 1265, a megabucks server 1266, and an image server 1267.

A casino hall server 1261 is a server for aggregating monetary flows in the casino to create a balance sheet and managing the servers in the management server block 1220. The currency exchange server 1262 is a server for acquiring exchange information from the external (the Internet 1015) through a communication line 1223. The casino/hotel staff management server 1260 is a server to manage attendance of the staffs working in the casino/hotel and the momentary locations of the staffs in the casino.

The member management server 1264 is a server for managing personal information on the members and information on the members such as their past game results. The IC card/money management server 1265 is a server for aggregating the sales by cashless IC cards. The megabucks server 1266 is a server for managing the amount pooled for a progressive jackpot or determining whether to release the progressive jackpot. The image server 1267 is a server to store and manage images of the faces of the staffs and players taken by the cameras installed in the casino.

A client terminal block 1221 includes gaming machines 1010 with player tracking system (PTS) terminals 1064 and a checkout machine 1268. Each gaming machine 1010 is connected to the management server block 1220 with a network via the PTS terminal 1064. As described above, one gaming machine 1010 includes a PTS terminal 1064 in its housing.

A staff terminal block 1222 includes a staff management terminal 1269 and a membership card issuing terminal 1270. The staff management terminal 1269 is controlled by the casino/hotel staff management server 1260. The staff management terminal sends information to a personal digital assistant (PDA) (not shown) carried by each staff or starts communication with a cellular phone carried by each staff based on a signal received from the casino/hotel staff management server 1260.

The PTS terminal 1064 includes, on the front thereof, an LCD unit 1101 for displaying a variety of information received from the management server block 1220, a card slot 1102 for receiving and ejecting an IC card, a player identification unit (a camera 1111, a microphone 1113, and a motion detector 1115) for identifying a player, an infrared LED 1257 for emitting infrared light to illuminate the player, such as the player's face, and ducts 1151 for outputting sound effects. The LCD unit 1101 has a touch panel.

The card slot 1102 is provided on a side (in the present embodiment, the right side) of the LCD unit 1101. This layout allows the player to insert an IC card into the card slot 1102 or receive an IC card ejected from the card slot 1102 using one hand (in the present embodiment, the right hand) without changing the posture of the player looking at the LCD unit 1101.

The PTS terminal 1064 further includes, in the inside thereof, an IC card R/W (reader/writer) for reading data in an IC card and writing data to the IC card (an RFID-R/W 1255 which will be described later with FIG. 19), a card stacker (not shown) for stocking IC cards, an IC card conveyer module 1253 for passing an IC card between the card slot 1102 and the IC card R/W and/or the card stacker, a speaker (not shown) outputting audio and sound effects toward the front of the PTS terminal 1064 through the ducts 1151, and a controller (a CPU 1241 and others in FIG. 19) for controlling the foregoing units provided in the PTS terminal 1064.

The IC card conveyer module 1253 has a roller driven and rotated by a motor to draw an IC card inserted into the card slot 1102 to a predetermined internal position with the rotation of this roller in the drawing direction and to eject an IC card to the outside from the card slot 1102 with the rotation of this roller in the ejecting direction.

The IC card R/W is for reading data from an IC card or writing data to an IC card with RFID (Radio Frequency Identification). The IC card R/W reads credit information stored in the IC card inserted from the card slot 1102 without contact or writes information on the credit provided to a player in accordance with a game result to the IC card without contact.

In the player identification unit, the camera 1111 is provided on the upper side of the LCD unit 1101 to take an image of the full face of the player looking at the LCD unit 1101. The camera provided to take an image of the player's face is not limited to a specific one; for example, a CCD camera or a CMOS sensor camera may be employed. The microphone 1113 is also provided on the upper side of the LCD unit 1101 to catch the player's voice in front of the player. The motion detector 1115 is provided on the upper side of the card slot 1102 to detect a motion of the player to insert an IC card into the card slot 1102. For the motion detector 1115, an infrared range sensor may be used, although not limited to this. The player identification unit detects a player with the motion detector 1115 as well as the camera 1111 and the microphone 1113.

The camera 1111 and the microphone 1113 may be mounted on the upper side of the card slot 1102 as indicated by the dot and dash line in FIG. 17, instead of the upper side of the LCD unit 1101. That is to say, instead of the camera 1111 and the microphone 1113, the camera 1112 and the microphone 1114 may be provided. Such a layout allows removal of the LCD unit 1101 to mount a different unit at the place of the LCD unit 1101. The camera 1112 provided on the upper side of the card slot 1102 has the same configuration as the camera 1111 and takes an image of a player obliquely. The microphone 1114 provided on the upper side of the card slot 1102 has the same configuration as the microphone 1113 and catches the player's voice obliquely.

The LCD unit 1101, the card slot 1102, the player identification unit, the speaker, and the ducts 1151 are integrally provided on a PTS panel 1105. This PTS panel 1105 is fixed to the cabinet 1011 with a bracket. That is to say, in the gaming machine 1010, the PTS panel 1105 on which the units forming the PTS terminal 1064, such as the LCD unit 1101, the card slot 1102, the player identification unit, the speaker (not shown), and the ducts 1151, are mounted integrally is fixed with a bracket to the PTS terminal section 1100 between the image display panel 1016 and the control panel 1020.

The LCD unit 1101, the camera 1111, the microphone 1113, and the ducts 1151 are integrally held in a bezel 1106.

As illustrated in FIG. 17, the PTS terminal 1064 is formed by mounting the LCD unit 1101, the card slot 1102, the camera 1111 (camera 1112), the microphone 1113 (microphone 1114) on the PTS panel 1105 integrally. The positions to mount these units forming the PTS terminal 1064 are determined by mounting bores formed in the PTS panel 1105.

As illustrated in FIG. 19, the PTS terminal 1064 includes a CPU 1241, a ROM 1242, a RAM 1243, a connector unit 1244, a communication interface 1245, and a hard disk drive 1246. The CPU 1241, the ROM 1242, and the RAM 1243 form a controller of the PTS terminal 1064. The communication interface 1245 is connected with the communication interface 1044 of the gaming machine 1010 mounting the PTS terminal 1064 via a communication line and is also connected with the management server block 1220 via a communication line. The ROM 1242 holds a system program for controlling operations of the PTS terminal 1064, data of calculated commissions for currency exchange, non-transitory data, and the like. The data of calculated commissions for currency exchange is data indicating calculated commissions for currency exchange P/1-P (P represents an exchange commission rate). The RAM 1243 temporarily stores exchange rate data indicating exchange rates in which the correspondence relations between the amount of the basic currency (US dollar) and the amounts of currencies other than the basic currency are defined by currency other than the basic currency.

The hard disk drive 1246 is to store image data of the images taken by the camera 1111 (camera 1112) controlled by a player identification module 1254. The hard disk drive 1246 corresponds to the memory in the present invention. After predetermined start-up operations are performed in response to power-on, the CPU 1241 stores image data acquired by taking an image with the camera 1111 (camera 1112) into the hard disk drive 1246. The storing image data is performed at predetermined time intervals (for example, 0.5 seconds). To each piece of image data, the time (timestamp) to store the image data in the hard disk drive 1246 is attached. The PTS terminal 1064 has a clock function and adjusts the time at every predetermined time interval. The time adjustment is performed by acquiring time data from a clock included in the management server block 1220 or the external through the Internet. When the remaining storage capacity has become less than a predetermined amount (for example, 100 MB), the CPU 1241 deletes image data having old timestamps in order from the oldest. However, it does not delete image data which is not designated as erasable.

The connector unit 1244 is connected with the bill validator 1022, a coin counter 1021C, the player identification module 1254, an RFID (Radio Frequency Identification) reader/writer 1255 (hereinafter, also referred to as RFID-R/W 1255), the LCD unit 1101, the IC card conveyer module 1253, a speaker module 1256, and the infrared LED 1257 by communication lines.

The bill validator 1022 identifies whether each bill (in the basic currency) is genuine and accepts genuine bills. Upon acceptance of a genuine bill, the bill validator 1022 outputs a signal to the CPU 1241. Specifically, the signal includes information on the amount of the accepted bill. The bill validator 1022 also identifies the kind of each bill among the bills in multiple currencies other than the basic currency and whether each bill is genuine, and accepts genuine bills. Upon acceptance of a genuine bill, the bill validator 1022 outputs a signal to the CPU 1241 based on the kind and the amount of the bill. The signal includes currency data indicating the kind of the identified currency and amount data indicating the amount in the currency. That is to say, the signal includes information on the kind and the amount of the accepted bill.

The coin counter 1021C is provided behind the coin slot 1021 to identify whether each coin inserted by the player into the coin slot 1021 is genuine. The coins other than genuine coins are ejected from a coin outlet 1019. The coin counter 1021C outputs a signal to the CPU 1241 upon detection of a genuine coin.

The player identification module 1254 controls the operation of the microphone 1113 (microphone 1114). The audio data obtained by catching sounds and voices is stored in the hard disk drive 1246 in the PTS terminal 1064. The player identification module 1254 also controls the operation of the camera 1111 (camera 1112). The image data obtained by taking images is stored in the hard disk drive 1246 in the PTS terminal 1064. The player identification module 1254 also controls the operation of the motion detector 1115. The detected results are stored in the hard disk drive 1246 in the PTS terminal 1064.

The RFID-R/W 1255 reads credit information from an IC card inserted into the card slot 1102 (FIG. 17) without contact and also writes credit information corresponding to a dividend generated as a result of games into the IC card.

The IC card conveyer module 1253 has a sensor (such as an optical sensor) for detecting an IC card inserted from the card slot 1102 and a motor for conveying the IC card to a predetermined position. Upon insertion of an IC card from the card slot 1102, the IC card conveyer module 1253 detects insertion of an IC card with the sensor and drives the motor to draw the inserted IC card into a predetermined position. Furthermore, when the player operates a TAKE WIN/COLLECT button 1027B (not shown) in a predetermined manner and credit information is written to the IC card, the IC card conveyer module 1253 rotates the motor reversely to eject the IC card with credit information written thereto from the card slot to the external.

The LCD unit 1101 displays information received from the management server block 1220 via the communication interface 1245.

The speaker module 1256 outputs audio or sound effects from the speaker (not shown) of the PTS terminal 1064 at the event such as detection of insertion of an IC card into the card slot 1102 or receipt of information to be displayed on the LCD unit 1101 from the management server block 1220.

<<Camera 1111 and Infrared LED 1257>>

The infrared LED 1257 emits infrared light based on a command output from the PTS terminal 1064. The infrared light emitted from the infrared LED 1257 lights the face of the player playing games with the gaming machine 1010. The camera 1111 takes an image of the player's face illuminated with the infrared light as a subject. The camera 1111 outputs an image signal representing the image of the player's face to the PTS terminal 1064. The CPU 1241 of the PTS terminal 1064 performs image recognition based on the image signal received from the camera 1111. The camera 1111 may be a CCD camera or a CMOS camera.

As to the camera 1111, filters (not shown) are provided in front of the infrared LED 1257 and the camera 1111. These filters transmit infrared light and do not transmit light having wavelengths other than the infrared wavelength. That is to say, the light received by the camera 1111 is only the light emitted from the infrared LED 1257 toward the subject, reflected by the subject, and transmitted through the filters.

Such use of the filters prevents the camera 1111 from receiving light of light effects of the gaming machine 1010 or the light effects in the game hall where the gaming machine 1010 is installed. As a result, the camera 1111 can take a clear image of the subject (player) while blocking the effect of the light other than the infrared light emitted from the infrared LED 1257.

The camera 1111 has the same functions as the foregoing camera 420 and the infrared LED 1257 has the same functions as the foregoing infrared LED 422. In taking an image of a player with the infrared LED 1257 illuminating a player with infrared light, the camera 1111 can function as a night vision camera. The night vision camera is a camera capable of taking an image of an object even in a dark place. The camera 1111 includes an optical system (such as a lens) that can receive light other than visible light such as infrared light and a signal system for converting received infrared light into an electric signal. The camera 1111 has a mechanism for handling wavelengths (frequencies) of light other than visible light. The camera 1111 may be configured to have a higher sensitivity to be able to receive a faint intensity of light.

The configuration that the infrared LED 1257 illuminates a player with infrared light and the camera 1111 takes an image of the player enables taking a clear image of a player's face even in an overseas casino where lighting is set at low. As a result, the casino can conduct personal authentication of players even when the lighting is set at low, improving the services in the casino.

The PTS terminal 1064 can perform a variety of processing related to the frequency of infrared light, such as sampling processing. Although the present embodiment provides an example in which the infrared LED 1257 emits infrared light, it may emit far-infrared light or near-infrared light. In such a case, it is preferable to change the frequency response of the camera 1111 as appropriate. In any case, it is sufficient if an identifiable image of the player can be taken even in a low-illuminated place such as a casino.

The brightness of the infrared light emitted from the infrared LED 1257 can be determined in accordance with various requirements. For example, the infrared LED 1257 usually emits infrared light at the lowest brightness. The lowest brightness includes the brightness in the state where the infrared LED 1527 is turned off. In response to a player's operation of the PTS terminal 1064, for example when the player operates the touch panel provided on the LCD unit 1101, the infrared LED 1257 emits infrared light at the highest brightness. This configuration enables taking a clear image of the player's face when the player operates the touch panel.

The player's operation is not limited to the operation of the touch panel provided on the LCD unit 1101 but may be insertion of an IC card.

Furthermore, not only the player's operation, the brightness can also be determined depending on the progress of the games in the gaming machine 1010. The PTS terminal 1064 is connected with the gaming machine 1010 via the communication interface 1245. For example, the PTS terminal 1064 can receive a signal indicating a lottery result in the gaming machine 1010. When a lottery result indicates that a bonus symbol is displayed, the PTS terminal 1064 may control the infrared LED 1257 to emit infrared light at the highest brightness. As a result, the PTS terminal 1064 can take an image of the player's face during bonus games, achieving management of an authenticated player.

The brightness of the infrared LED 1257 can be determined through the same processing illustrated in the foregoing FIGS. 9, 10, 12, and 15.

For example, as illustrated in FIG. 21, the PTS terminal 1064 acquires player identification information such as an image and audio from the player identification module (the camera 1111 (camera 1112), the microphone 1113 (microphone 1114), and the motion detector 1115 (FIG. 17)) (Step S2111) and sends this information to the member management server 1264 in the management server block 1220 (Step S2112). The member management server 1264 identifies the player based on the received player identification information and authenticates the player based on the identification result (Step S2113). If the authentication result indicates that the player is a registered member, the member management server 1264 sends a download request to the download server 1263 together with information designating the PTS terminal 1064 (Step S2114). As a result, service information unique to the player is downloaded from the download server 1263 to the PTS terminal 1064 of the gaming machine 1010 with which the player is playing games (Step S2115). For example, if the player is a player registered in the member management server 1264 in the management server block 1220 (FIG. 20), helpful information (such as information related to merchandise and information about plays in a theater) are downloaded from the member management server 1264 to the PTS terminal 1064 that has sent information on the player to the download server. This information is displayed on the LCD unit 1101 of the PTS terminal 1064 (Step S2116).

As noted from the above, a PTS terminal 1064 is provided integrally with a gaming machine 1010 and the PTS terminal 1064 includes an LCD unit 1101 in front of a player taking a position to play games with the gaming machine 1010 so that the player can easily look at the LCD unit 1101. In this PTS terminal 1064, a camera 1111 for taking an image of the full or oblique face of the player keeping the position, a microphone 1113 for catching the voice of the player keeping the position, and a motion detector 1115 for detecting the player keeping the position are provided for the player identification module.

This player identification module, the LCD unit 1101, and the card slot 1102 are positioned to specified places in the PTS terminal 1064 with a PTS panel 1105 ). As described above, these places are determined to be suitable for the player's natural position in playing games with the gaming machine 1010. Integrating such a PTS terminal 1064 having a fixed layout with the gaming machine 1010 ensures unfailing recognition of the player.

Since the PTS terminal 1064 needs to be mounted at a limited place of the PTS terminal section 1100 (FIG. 17) in the gaming machine 1010, the speaker (not shown) of the PTS terminal 1064 is placed behind the LCD unit 1101 and the sound effects from the speaker is output to the front through the ducts 1151 opening on the front of the LCD unit 1101. Since the speaker is placed on the backside, further downsizing the PTS terminal 1064 is available, so that the PTS terminal 1064 can be placed in the limited PTS terminal section 1100.

REFERENCE SIGNS LIST

- 110 Pachinko game machine (gaming machine)
- 210 Pachi-slot game machine (gaming machine)
- 310 Game media dispenser
- 320 Camera (imaging device)
- 322 Infrared LED (lighting device)
- 410 Game media dispenser
- 420 Camera (imaging device)
- 422 Infrared LED (lighting device)
- 360 Data display device
- 460 Data display device
- 500 Hall computer
- 1010 Gaming machine
- 1064 PTS terminal
- 1111 Camera (night vision camera)
- 1257 Infrared LED

The invention claimed is:

1. A game peripheral device, comprising:
    an imaging device that takes an image of a player's face;
    a lighting device that emits illumination light to illuminate the player's face;
    a brightness determination signal detection device configured to detect a brightness determination signal;
    an emission brightness determination device configured to set an emission brightness of the illumination light based on detection of a brightness determination signal; and
    a lighting controller configured to control the lighting device to emit illumination light based on the emission brightness set by the emission brightness determination device,
    wherein the emission brightness determination device sets the emission brightness at a first emission brightness under a condition where a brightness determination signal associated with taking an image of a player's face has been detected, and
    wherein the emission brightness determination device sets the emission brightness at a second emission brightness, which is lower than the first emission brightness, once the imaging device has taken the image of the player's face.

2. A game peripheral device according to claim 1,
    wherein the brightness determination signal detection device detects an operation signal output based on a predetermined operation by an operator and indicates the predetermined operation by the operator as the brightness determination signal, and
    wherein the emission brightness determination device sets the emission brightness at the first emission brightness under a condition where the operation signal has been detected as the brightness determination signal.

3. A game peripheral device according to claim 1,
    wherein the brightness determination signal detection device detects a game signal output from a game machine based on a predetermined operation on the game machine and indicates game information in the game machine as the brightness determination signal, and
    wherein the emission brightness determination device sets the emission brightness at the first emission brightness under a condition where the game signal has been detected as the brightness determination signal.

4. An arrangement of gaming machines, comprising first and second gaming machine islands,
    wherein each of the gaming machine islands includes at least one gaming machine and an associated game peripheral device as recited in claim 1,
    wherein the gaming machine islands are spaced apart from each other by a predetermined distance; and
    wherein the lighting device of the game peripheral device associated with a gaming machine in the first island emits illumination light in a direction toward the imaging device associated with a gaming machine in the second gaming machine island.

* * * * *